United States Patent
Kingsley et al.

(10) Patent No.: US 11,907,782 B2
(45) Date of Patent: Feb. 20, 2024

(54) MULTI-LEVEL AUTHENTICATION USING DIFFERENT MATERIALS

(71) Applicant: University of Massachusetts, Boston, MA (US)

(72) Inventors: Edward D. Kingsley, Stow, MA (US); Oshadha K. Ranasingha, Salem, NH (US); Andrew M. Luce, Marlborough, MA (US); Alkim Akyurtlu, Arlington, MA (US); Craig A. Armiento, Acton, MA (US); Yuri A. Piro, Cambridge, MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 17/792,504

(22) PCT Filed: Feb. 3, 2021

(86) PCT No.: PCT/US2021/016335
§ 371 (c)(1),
(2) Date: Jul. 13, 2022

(87) PCT Pub. No.: WO2021/158610
PCT Pub. Date: Aug. 12, 2021

(65) Prior Publication Data
US 2023/0056201 A1    Feb. 23, 2023

Related U.S. Application Data

(60) Provisional application No. 62/970,840, filed on Feb. 6, 2020.

(51) Int. Cl.
G06K 19/06    (2006.01)
B42D 25/387    (2014.01)
G07D 7/06    (2006.01)

(52) U.S. Cl.
CPC ..... G06K 19/06037 (2013.01); B42D 25/387 (2014.10); G07D 7/06 (2013.01)

(58) Field of Classification Search
CPC ... G06K 19/06037; B42D 25/387; G07D 7/06
(Continued)

(56) References Cited

U.S. PATENT DOCUMENTS 7,267,285 B2    9/2007    Berson
7,425,899 B2    9/2008    Stewart et al.
(Continued)

OTHER PUBLICATIONS

International Search Report, PCT/US2021/016335, dated Jun. 23, 2021, pp. 1-4.

*Primary Examiner* — Daniel A Hess
(74) *Attorney, Agent, or Firm* — Armis IP Law, LLC

(57) ABSTRACT

Among other concepts, this disclosure describes a thermal/optical/electronic authentication system (covert or non-covert) for device/system implementations. The authentication system may be based on different design parameters such as i) materials composition, ii) thickness of material, iii) geometry of material, iv) external effects including use of an external DC bias and curing, etc. The authentication testbeds can be configured to include one or more inks. Using such methods as discussed herein, the authentication can be broadened to include near-IR (700-900 nm), short wave IR (1-2.6 mm), and UVA (300-400 nm) or any spectrum. Printed resistors are very difficult to duplicate without Ag-BST13 ink. If necessary, a printed resistor network on a respective substrate can be hidden using a layer of non-sintered Ag-BST13 (non-conductive).

18 Claims, 17 Drawing Sheets

(58) Field of Classification Search
USPC .......................................................... 235/494
See application file for complete search history.

(56) References Cited

U.S. PATENT DOCUMENTS

| | | |
|---|---|---|
| 8,281,997 B2 | 10/2012 | Moran et al. |
| 9,715,652 B2 | 7/2017 | Foerster et al. |
| 2009/0320998 A1 | 12/2009 | Nees et al. |

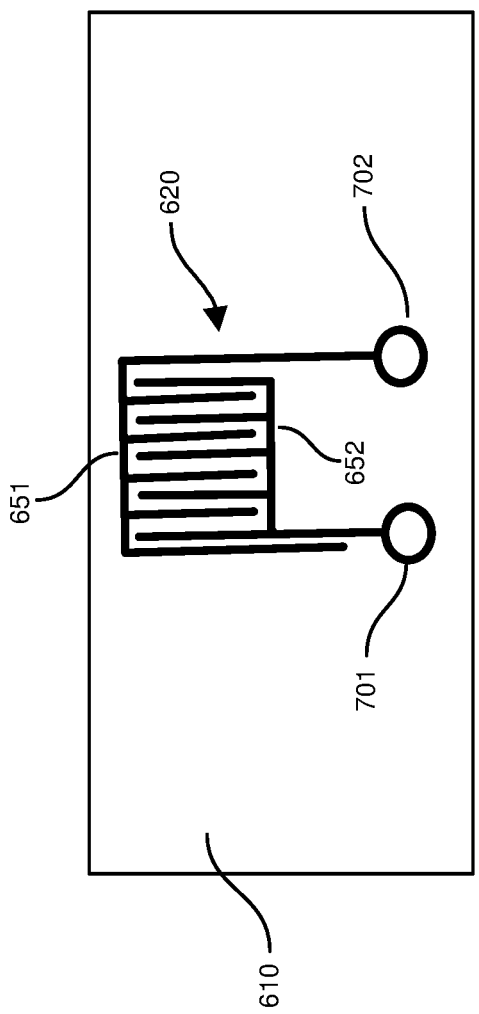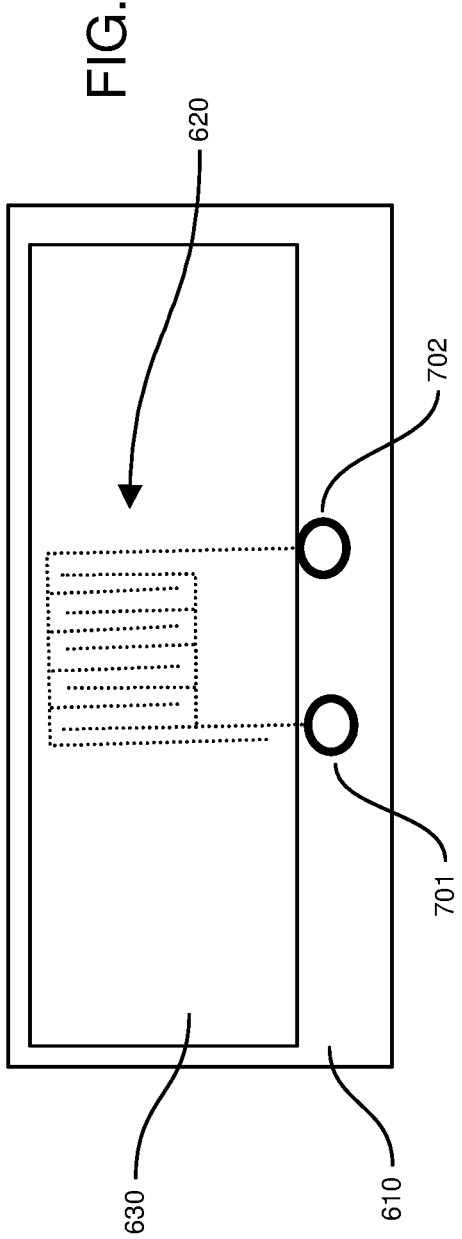

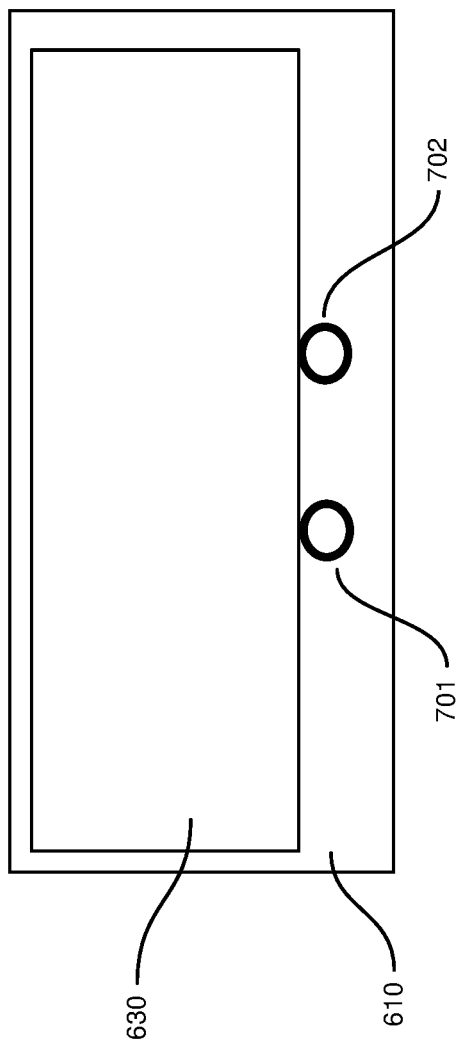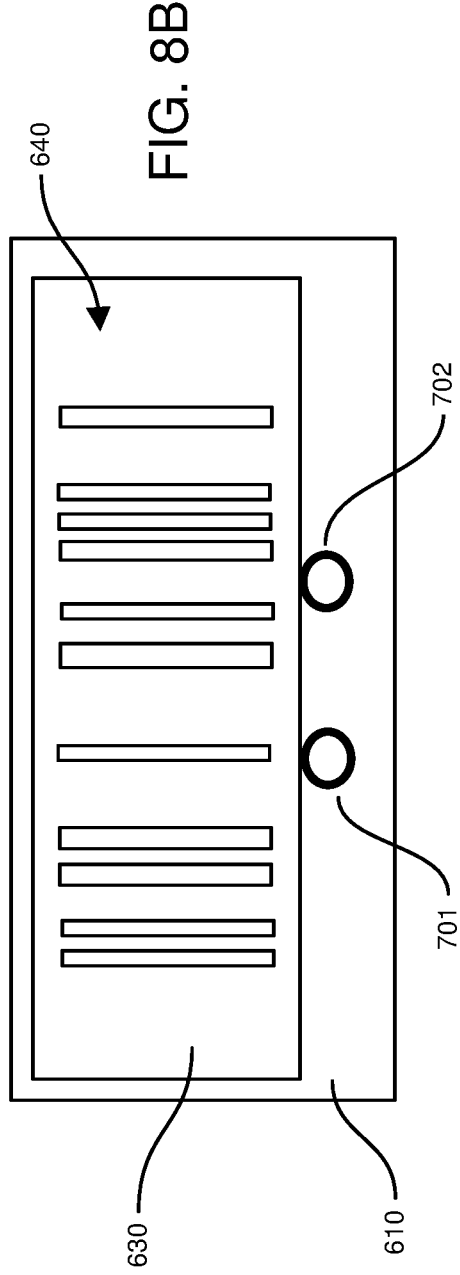

MULTI-LEVEL AUTHENTICATION USING DIFFERENT MATERIALS

RELATED APPLICATIONS

This application is a national stage filing of PCT application No. PCT/US2021/016335 filed Feb. 3, 2021, entitled MULTI-LEVEL AUTHENTICATION USING DIFFERENT MATERIALS, the entire teachings of which are incorporated herein by reference.

PCT application No. PCT/US2021/016335 claims priority to earlier filed U.S. Patent Application Ser. No. 62/970,840 entitled "METAL & DIELECTRIC INK-BASED ELECTRONIC AUTHENTICATION USING PRINTED MATERIALS,", filed on Feb. 6, 2020, the entire teachings of which are incorporated herein by this reference.

U.S. Patent Application Ser. No. 62/970,840 is related to earlier filed U.S. Patent Application Ser. No. 62/881,646 entitled "PRINTABLE DIELECTRIC MIXTURE, USE, AND MANUFACTURE," filed on Aug. 1, 2019, the entire teachings of which are incorporated herein by this reference.

U.S. Patent Application Ser. No. 62/970,840 is related to earlier filed U.S. patent application Ser. No. 16/184,796 entitled "PRINTABLE DIELECTRIC MIXTURE, USE, AND MANUFACTURE," filed on Nov. 8, 2018, the entire teachings of which are incorporated herein by this reference.

Any material, or portion of the above incorporated patent application is only incorporated to the extent that no conflict arises between that incorporated material and the present disclosure material. In the event of a conflict, the conflict is to be resolved in favor of the present disclosure as the preferred disclosure.

BACKGROUND

Conventional electronic devices can be printed on a substrate using print techniques as described in U.S. Patent Publication 2017/0009090. For example, this cited patent publication describes a ferroelectric ink comprising Barium Strontium Titanate (BST) in a polymer composite is described. This conventional ink can be employed using direct-ink writing techniques to print high dielectric constant, low loss, and electrostatically-tunable dielectrics on substrates.

Product counterfeiting has emerged as a significant economic issue, with the market value of pirated products equaling or exceeding the gross domestic product of some European countries. A 2016 report1 from OECD in cooperation with the EU Intellectual Property Office (EUIPO) found that in 2013 counterfeit products sold were worth $431 bn, totaling 2.5 percent of global trade. That's nearly equal to the gross domestic product of Switzerland and more than that of countries including Austria, Portugal and Ireland in 2013. According to the Global Brand Counterfeiting Report 2018, counterfeit goods reached 1.2 Trillion USD in 2017 and are set to grow to over 1.8 Trillion USD by 2020. The luxury sector is particularly hard hit with approximately 10% of sales lost each year to counterfeit goods.

BRIEF DESCRIPTION OF EMBODIMENTS

In contrast to conventional inks and systems, embodiments herein include novel ways of providing authentication.

First Embodiments

More specifically, in one example embodiment, an apparatus (such as an authentication device, authentication tag, authentication hardware, etc.) includes a substrate and a first layer of material disposed on the substrate. Multiple authentication components are disposed at different locations in the first layer of material. A combination of the multiple authentication components provides a unique signature associated with the apparatus and any item to which the apparatus (device) pertains.

In one embodiment, the apparatus serves as a way to identify if an item tagged with the apparatus is authentic or not. As further discussed herein, the apparatus is difficult to reproduce, providing a level of security that the item to which the apparatus pertains (such as the item or object to which the apparatus is attached) is authentic.

In accordance with further example embodiments, each of the multiple authentication components is a respective electronic circuit component such as shown, for example, a resistor, a capacitor, etc. Attributes, such as capacitance, resistance, etc., associated with each of the multiple authentication components varies depending on fabrication parameters such as dimensions (length, width, height), duration of applied heat in a region, etc.

The apparatus as described herein can include any number of layers of material. For example, in one embodiment, the apparatus includes at least a second layer of material disposed on the first layer of material. In one embodiment, the second layer of material prevents the multiple authentication components from being viewable via a human visible spectrum of light.

Additionally, or alternatively, the apparatus includes a second layer of material disposed on the first layer of material including fabrication of second authentication components disposed at different locations. In one embodiment, the second authentication components are non-overlapping with respect to the first authentication components. In accordance with further non-limiting example embodiment, each of the first authentication components in the first layer of material is emissive (i.e., the components are operative to emit a signal); and wherein each of the second authentication components is reflective (i.e., each of the second authentication components reflects a respective input signal).

Note that each of the authentication components in the same or different layers of material can be fabricated to have a different emissivity, different reflectivity, different transparency, etc.

The multiple authentication components are disposed at different locations of the first layer of material. For example, in one embodiment, the multiple authentication components include a first authentication component and a second authentication component. The first authentication component is fabricated at a first location of the first layer of material. In one embodiment, the first authentication component is fabricated via application of localized heat to the first location of the first layer of material. The second authentication component is fabricated at a second location of the first layer of material. In one embodiment, the second authentication component is fabricated via application of localized heat to the second location. The first layer of material can be configured to include any number of authentication components, each uniquely fabricated to provide a different response to an input signal(s).

Note that as an alternative to fabricating the authentication components via fabrication of localized heat such as via a laser or other suitable entity, embodiments herein include fabrication of the multiple authentication components via application of one or more chemical/printable ink applied to the different locations in the layer of material.

In one embodiment, each of the layers of material on the substrate is a printable ink cured on the substrate and is subsequently processed to fabricate the multiple authentication components, attributes of which are modified during fabrication of respective one or more authentication components.

In a more specific non-limiting example embodiment, the first layer of material is a compound comprising: first particles, the first particles being an insulator material; second particles, the second particles being electrically conductive material; and a combination of the first particles and the second particles distributed and suspended in a printable material in which a cured state of the printable material is transformable into an electrically conductive paths via application of heat above a threshold value or chemicals that change a property of the compound.

In yet further example embodiments, the cured first layer of material on the substrate is initially non electrically conductive because the first particles separate or reduce the second particles from contacting each other. In one embodiment, fabrication of the multiple authentication components includes modifying the state of the cured first layer of material such that the modified one or more locations includes regions in which the second particles contact each other to provide a more electrically conductive path (than the initial state of the first layer of material).

Note that the different layers of material (such as different layers of cured printable ink) support different types of authentication components. For example, one layer of the apparatus as described herein includes first authentication components that have emissive properties (such as generation of thermal energy) when driven with a respective signal. Another layer of the apparatus as described herein includes authentication components that have reflective properties (such as reflection of incoming energy, optical signal, etc.). Another layer of the apparatus as described herein includes authentication components that have transmissive properties (such as transmission of incoming energy, optical signal, etc.).

In yet further example embodiments, the layer of material on the substrate is transformable dielectric material in which the multiple authentication components are fabricated via modification of the transformable dielectric material such as silver-BST or other suitable material.

In one embodiment, each of the respective multiple authentication components in the layer of material emits a different amount of thermal energy when activated via a corresponding applied signal. The unique emission of different amounts of thermal energy (such as based on detected temperature) from each of the authentication components defines the overall signature of the authentication device. In one embodiment, sensor hardware maps attributes of the different magnitudes of thermal energy (such as measured via temperature) is compared (mapped) to a known-to-be valid thermal signature. Based on a match of the thermal signature of the apparatus under test to a valid signature, the sensor hardware indicates that the authentication device is valid.

Note that any sensor hardware as described herein can include multiple different types of sensors. For example, first authentication sensor hardware can be configured to analyze attributes of one or more authentication components (location, amount of feedback signal, etc.) in the first layer of material of the apparatus; second authentication sensor hardware can be configured to analyze attributes of one or more authentication components (location, amount of feedback signal, etc.) in the second layer of material of the apparatus; third authentication sensor hardware can be configured to analyze attributes of one or more authentication components (location, amount of feedback signal, etc.) in the third layer of material; and so on. The different levels sensing at the different layers of material and corresponding analysis provides further assurances that the apparatus (or item to which it is attached) is authentic.

As previously discussed, a layer of material on the substrate can include multiple authentication components that reflect a different amount of thermal energy when exposed to an applied optical input signal. For example, each authentication component can be precisely fabricated such that each of the authentication components has a different response to incident received energy or signal. For example, a first authentication component fabricated in the respective layer of material may provide a first reflectivity of the incident energy (note that each component as discussed herein has different reflectivity; embodiments herein include detecting different thermal signatures due to the different reflectivities of the printed components); a second authentication component fabricated in the respective layer of material may provide a second reflectivity of the incident energy; a third authentication component fabricated in the respective layer of material may provide a third reflectivity of the incident energy; and so on. In one embodiment, om sensor devices measure reflected thermal energy associated with each of the different regions of authentication components to determine a unique signature associated with the authentication device.

In accordance with further example embodiments, the apparatus as described herein includes electronic circuitry operative to drive the multiple authentication components with a signal (such as current, voltage, optical signal, etc.). In one embodiment, each of the multiple authentication components emits a respective wireless signal depending on attributes of the authentication component emitting the respective signal. As previously discussed, via analysis of the different emitted signals, a respective sensor is able to determine authenticity of apparatus and corresponding object to which it pertains.

As previously discussed, the first layer of material (and/or one or more other layers of the apparatus as described herein) is a compound comprising: first particles, the first particles being an insulator material; second particles, the second particles being electrically conductive material. In accordance with further embodiments, the second particles are fabricated from silver (Ag). In a yet further embodiment, a ratio of the silver particles to the second particles is approximately 62.5 to 37.5 by weight. Additionally, or alternatively, the second particles are Barium Strontium Titanate (BST) particles.

In still further embodiments, a melting point of the second particles is higher than a melting point of the first particles. A ratio of the first particles to second particles can vary depending on the embodiment. In one embodiment, a ratio of the first particles to the second particles is selected such that a group of the second particles in the cured printable material are substantially isolated from each other (such as not touching either to form a continuous conductive path) prior to application of heat to the group of second particles above a threshold value. Heating the cured printable material above a threshold value causes the second particles to contact each other due to the sintering of silver nanoparticles and form conductive paths.

Further embodiments herein include exposure of the dielectric material (cured printable material) to heat. In one embodiment, exposure of the dielectric layer of material to heat above the threshold value causes contact amongst the second particles in the group due to the sintering of silver nanoparticles, the heat converting a portion of the cured printable material into an electrically conductive path.

In accordance with further embodiments, the second particles are silver nanoparticles; the first particles are BST nano particles. The compound includes at least one solvent such as 1-methoxy-2-propanol and/or ethylene glycol. In one embodiment, the compound is made up of more than 40% by weight of ethylene glycol.

In yet further embodiments, the first particles make up approximately 12.5% of the compound by weight; the second particles make up approximately 21% of the compound by weight; and the mixture of one or more solvents makes up approximately 66.5% of the compound by weight prior to curing. Subsequent to curing, when the solvents in the printable material evaporate, the cured printable material is between 60-70% made up of first particles and 30-40% made up of second particles.

Second Embodiments

In accordance with further example embodiments, a security apparatus comprises: a substrate; a pattern of electrically conductive material disposed on the substrate; a layer of material disposed over the pattern of electrically conductive material; and a pattern of at least one type of ink disposed on the layer of material.

In one embodiment, the at least one type of ink includes a first color of ultraviolet ink and a second color of ultraviolet ink. The first color of ultraviolet ink printed on the layer of material is invisible in the absence of ultraviolet light and visible in the presence of ultraviolet light; and the second color of ultraviolet ink is invisible in the absence of ultraviolet light and visible in the presence of ultraviolet light.

In yet further example embodiments, the pattern of at least one type of ink is a code (barcode, tag, unique pattern, etc.) defined by dimensions of regions of the at least one type of ink disposed on the layer of material.

The layer material can be fabricated from any suitable manner. For example, in one embodiment, the layer material is a semiconductor material. Additionally or alternatively, the layer of material is fabricated via ferroelectric ink.

In one embodiment, the layer of material is fabricated from so-called wide-bandgap semiconductor material such as Titanium dioxide, Zinc oxide, etc. Conventional semiconductors like silicon have a bandgap in the range of 1-1.5 electronvolt (eV), whereas wide-bandgap materials have bandgaps in the range of greater than 2-4 eV. Generally, wide-bandgap semiconductors have electronic properties which fall in between those of conventional semiconductors and insulators.

In further example embodiments, the at least one ultraviolet ink disposed on the layer material includes a first ultraviolet ink disposed on a surface of the layer of material, the first ultraviolet ink is operative to emit an optical signal in response to absorption of ultraviolet light.

Still further embodiments herein include an apparatus in which the pattern of electrically conductive material includes a first electrode and a second electrode. In one embodiment, the electrically conductive material forms a capacitive circuit. The apparatus further includes a circuit coupled to the first electrode and the second electrode. The circuit measures a capacitance of the capacitive circuit. The magnitude of the capacitance of the capacitive circuit varies depending on the presence/absence of a body part in contact with a surface of the layer of material.

In further example embodiments, the pattern of electrically conductive material includes a first electrode and a second electrode. The apparatus or system as discussed herein can be configured to further include a circuit coupled to the first electrode and the second electrode, the circuit operative to measure an electrical signal generated by the pattern of electrically conductive material. A magnitude of the electrical signal varies depending on absorption of an optical signal by the layer of material.

In yet further example embodiments, the pattern of electrically conductive material includes a first circuit path and a second circuit path. In one embodiment, the layer of material is dielectric material disposed between the first circuit path and the second circuit path.

In further example embodiments, the pattern of at least one type of ink disposed on the layer of material is invisible to a human eye in the presence of light in the visible spectrum. Application of ultraviolet light or infrared light causes the at least one type of ink to emit an optical signal.

In one embodiment, the pattern of at least one ink disposed on the layer of material includes: a first region of the layer of material printed with a first ink type, the first region operative to emit a first optical signal via exposure of the first region to ultraviolet light; a second region of the layer of material printed with a second ink type, the second region operative to emit a second optical signal via exposure of the second region to heat; and a third region of the layer of material printed with a third ink type, the third region operative to emit a third optical signal via exposure of the third first region to near infrared light.

Detection of the different characteristics associated with the apparatus in the presence of ultraviolet light, infrared light, heat, etc., enables unique authentication over conventional techniques, without the need for complex data processing equipment.

Further embodiments herein include a test system to authenticate the apparatus as discussed herein. For example, the authentication test system receives the apparatus as previously discussed.

To test authenticity, in one embodiment, the test system applies an optical signal to a surface of the layer of material. As a first part of an authentication test, the test system produces one or more first images the different types of ink illuminated in the ink pattern printed on the layer of material. The different types of ink are illuminated the application of one or more stimuli such as an ultraviolet optical signal, an infrared optical signal, heat, etc., to the layer of material on which the pattern of ink is printed.

As a second part of the authentication test, the test system measures a first electronic signal generated by the pattern of electrically conductive material. In one embodiment, the pattern of electrically conductive material is a capacitance circuit that generates the first electronic signal in response to one or more condition such as presence or absence of a respective body part in contact with the layer of material. Via the first electronic signal, the test system determines a capacitance (or changing capacitance) associated with the pattern of electrically conductive material.

As a third part of the authentication test, via a second electronic signal produced by the pattern of electrically conductive material, the test system determines current produced by the pattern of electrically conductive material as a result of applying an optical signal to the surface of the layer of material. In one embodiment, the layer of material disposed over the electrically conductive material converts energy from the optical signal applied to the layer of material into the second electronic signal (such as a respective voltage and/or current).

As a fourth part of the authentication test, the authentication system applies heat to a surface of the layer of material. Application of the heat to the surface of the layer of material causes the regions of printed ink to emit optical signal. In one embodiment, during application of the heat, the authentication system produces a second image of a second type of ink illuminated in the pattern of at least one type of ink on the layer. If desired the first image, second image, etc., can be combined to detect an overall unique signature associated with the apparatus (security device) as discussed herein.

Further embodiments herein include a method fabricating a respective device, the method include: receiving a substrate; fabricating a pattern of electrically conductive material on the substrate; fabricating a layer of material over the pattern of electrically conductive material; and fabricating a pattern of at least one type of ink on the layer of material.

Further embodiments herein include a method comprising: receiving the apparatus (device) in which the device includes multiple inks disposed on the layer of material; applying an optical signal to a surface of the layer of material on which the multiple inks are disposed; producing an image of the multiple inks; and utilizing the image of the multiple inks to determine an authenticity of the apparatus.

In one embodiment, the multiple inks include: i) a first ink disposed in a first region on a surface of the layer of material, and ii) a second ink disposed in a second region on the surface of the layer of material.

In further example embodiments, exposure of the first ink to the optical signal results in emission of a first color of light from the first ink disposed on the layer of material; and exposure of the second ink to the optical signal results in emission of a second color of light from the second first ink disposed on the layer of material. In accordance with producing the image, the test system measures an electronic signal generated by the pattern of electrically conductive material in the device. The test system determines authenticity of the apparatus based on i) dimensions of the detected first ink and detected second ink on the surface of the layer of material, and ii) the measured electronic signal. In one embodiment, as previously discussed, the dimensions and location of the detected first ink and detected second ink define a code that is used to authenticate the device or corresponding item to which the device is attached.

In accordance with yet further example embodiments, via the measured electronic signal, the test system determines a capacitance associated with the pattern of electrically conductive material. Additionally, or alternatively, via the electronic signal, the test system measures current produced by the pattern of electrically conductive material as a result of applying the optical signal to the surface of the layer of material.

In still further example embodiments, the test system simultaneously applies the optical signal and a heat signal to the surface of the layer of material. In such an instance, the image includes detected illumination of a first ink and a second ink disposed on the surface of the layer of material as a result of applying the optical signal; the image also includes detected presence of a third ink disposed on the surface of the layer of material as a result of applying the heat. The test system analyzes attributes of the multiple detected inks and attributes of the electronic signal to determine whether the apparatus (device) is authentic.

Note that any of the resources as discussed herein such as a fabricator (fabrication facility) can include one or more computerized devices, workstations, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium or hardware storage media disparately or co-located) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage media such as an optical medium (e.g., CD-ROM), floppy disk, hard disk, memory stick, memory device, etc., or other a medium such as firmware in one or more ROM, RAM, PROM, etc., and/or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations such as fabrication of one or more optical devices as discussed herein.

Further embodiments herein include a computer readable storage media and/or a system having instructions stored thereon to facilitate fabrication of one or more mixtures and corresponding electronic devices as discussed herein. For example, in one embodiment, the instructions, when executed by computer processor hardware, cause the computer processor hardware (such as one or more processor devices) associated with a fabricator to: receive a substrate; dispose a first layer of material on the substrate; and fabricate multiple authentication components at different locations in the first layer of material, a combination of the multiple authentication components having a unique signature.

Further embodiments herein include a computer readable storage media and/or a system having instructions stored thereon to facilitate fabrication of one or more devices as discussed herein. For example, in one embodiment, the instructions, when executed by computer processor hardware, cause the computer processor hardware (such as one or more processor devices) associated with a fabricator to: receive a substrate; fabricate a pattern of electrically conductive material on the substrate; fabricate a layer of material over the pattern of electrically conductive material; and fabricate a pattern of at least one type of ink on the layer of material.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the method as discussed herein also can be embodied strictly as a software program, firmware, as a hybrid of software, hardware and/or firmware, or as hardware alone such as within a processor (hardware or software), or within an operating system or a within a software application.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding drawings of the present disclosure as further discussed below.

BRIEF DESCRIPTION OF THE DRAWINGS

FIG. 7A is an example diagram illustrating a pattern of electrically conductive material disposed in a first layer of an authentication tag/device according to embodiments herein.

FIG. 7B is an example diagram illustrating a layer of material disposed over the pattern of electrically conductive material of an authentication tag/device according to embodiments herein.

FIG. 8A is an example diagram illustrating a layer of material disposed over the pattern of electrically conductive material of an authentication tag/device according to embodiments herein.

FIG. 8B is an example diagram illustrating regions of printed ink disposed on a layer of material of an authentication tag/device according to embodiments herein.

Figure 1:
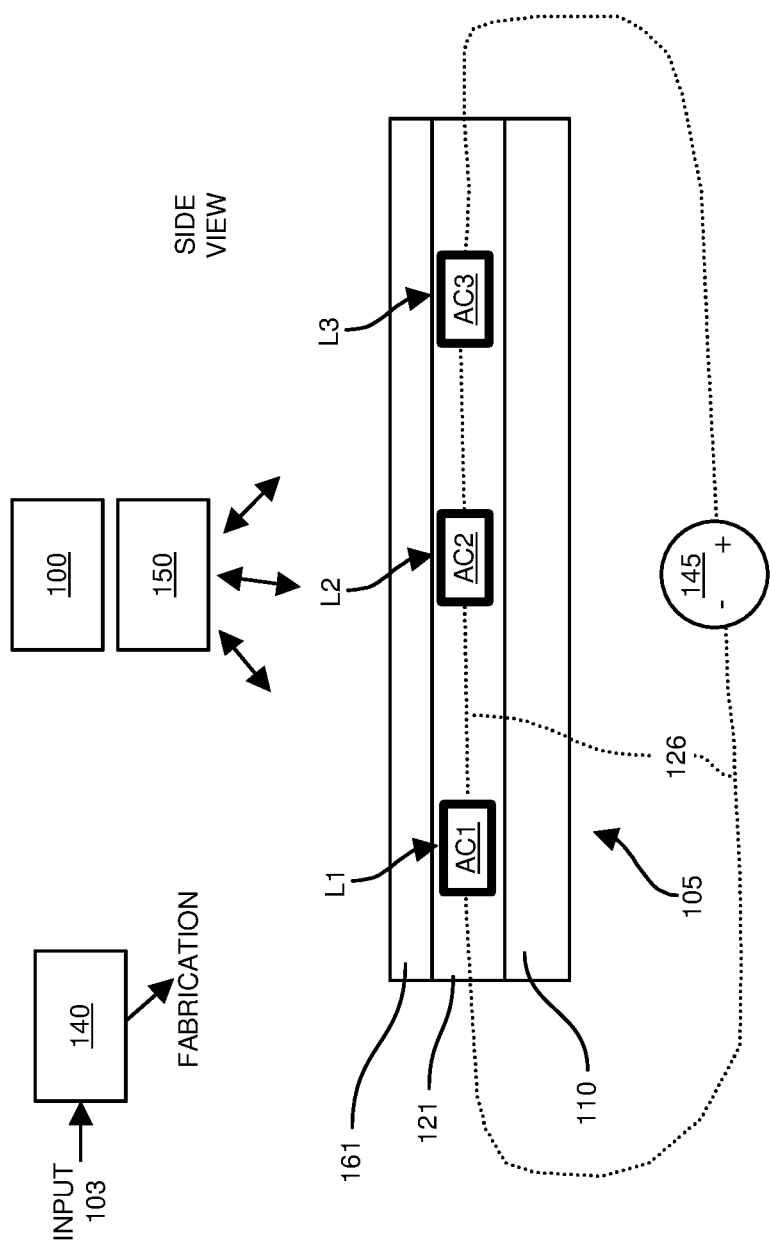
FIG. 1 is an example side view diagram of an authentication device and corresponding authentication components according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

More specifically, with reference to the drawings, FIG. 1 is an example side view diagram of an authentication device and corresponding authentication components according to embodiments herein.

As shown in FIG. 1, the device 105 (such as an apparatus, authentication device, authentication tag, authentication hardware, etc.) includes a substrate 110 and a first layer of material 121 disposed on the substrate 110 (such as planar if desired).

Multiple authentication components AC1, AC2, and AC3 are disposed at different locations in the first layer of material 110.

In one embodiment, based on viewing (monitoring) from sensor 150, a combination of the multiple authentication components provides a unique signature associated with the device 105 and any item to which the apparatus pertains. For example, the device is attached to an object. In one embodiment, the device 105 serves as a way to identify if a corresponding item (object) tagged with the device 105 is authentic or not.

Note further that the device 105 as described herein is difficult to reproduce, providing a level of security that the corresponding item to which the apparatus pertains (such as the item or object to which the apparatus is attached) is authentic.

In one embodiment, each of the multiple authentication components AC1, AC2, and AC3 is a respective electronic circuit component such as, for example, a resistor, a capacitor, etc. Attributes, such as capacitance, resistance, etc., associated with each of the multiple authentication components varies depending on authentication component fabrication parameters such as dimensions (length, width, height)

as well as an amount of transformation of the respective region (where authentication complements AC1, AC2, etc. reside) in the layer of material 121 resulting from application of heat.

In accordance with further example embodiments, the authentication components AC1, AC2, and AC3 are not electronic circuit components. Instead the authentication components are uniquely modified regions having unique attributes (such as unique reflective or transparency properties) as further discussed herein.

In one embodiment, the layer of material 121 is fabricated from any of multiple types of ink cured on a surface of the substrate 110. Embodiments herein include modifying specific locations of the layer of material 121 to produce the different authentication components AC1, AC2, AC3, etc.

The apparatus as described herein can include any number of layers of material. For example, in one embodiment, the device 105 includes at least a second layer of material 161 (such as opaque material) disposed on the first layer of material 121 such as to hide it from view. More specifically, the second layer of material 161 in this example embodiment prevents the multiple authentication components from being viewable via a human visible spectrum of light.

In accordance with further example embodiments, one or more of the authentication components AC1, AC2, and AC3 are interconnected to each other via a respective circuit path 126. In one embodiment, the device 105 (a.k.a., apparatus) as described herein further includes or is coupled to electronic circuitry such as voltage source 140 operative to drive current through the multiple authentication components AC1, AC2, and AC3, via application of a signal (such as current, voltage, etc.).

In one embodiment, each of the multiple authentication components emits a measurable response to an applied input stimulus.

The one or more responses (such as emissions from the authentication components based on application of energy) can take any from such as a respective wireless signal, thermal energy, etc., depending on attributes of the authentication component and corresponding circuitry emitting the respective signal.

As previously discussed, via analysis of the different emitted signals such as thermal signals T1, T2, T3, a respective sensor 150 determines authenticity of the device 105 and corresponding object (item) to which it pertains via a respective analysis of the emitted one or more signals T1, T2, T3, etc.

In one nonlimiting example embodiment, the signals T1, T2, T3, represent different thermal energy emitted from the respective authentication components. The sensor 150 detects a magnitude of the thermal energy from each respective location of the layer of material 121 where the authentication components reside and determines an authenticity of a unique pattern of the magnitudes of different temperature T1, T2, and T3 in each of the different respective regions.

For example, via application of a first input voltage (such as 12 VDC) from voltage source 140, first current flows through the circuit path 126 heating the authentication component AC1 (such as approximately 15 ohms), AC2 (such as approximately 45 ohms), AC3 (such as approximately 65 ohms), etc. In such an instance, the authentication component AC1 at location L1 generates unique thermal signal T11 (such as 50 degrees C.); the authentication component AC2 at location L2 generates unique thermal signal T12 (such as 35 degrees C.); the authentication component AC3 at location L3 generates unique thermal signal T13 (such as 70 degrees C.); etc. The sensor 150 detects the unique temperature signature (T11, T12, and T13) in the different respective locations of the device 105 for the first applied voltage V1. In one embodiment, the system 100 matches the detected temperature signature feature associated with the device 105 to a known signature to authenticate the device as being valid.

Via application of a second input voltage (such as 14 VDC) from voltage source 140, second current flows through the circuit path 126 heating the authentication component AC1 (such as approximately 15 ohms), AC2 (such as approximately 45 ohms), AC3 (such as approximately 65 ohms), etc. In such an instance, the authentication component AC1 at location L1 generates unique thermal signal T11 (such as 60 degrees C.); the authentication component AC2 at location L2 generates unique thermal signal T12 (such as 45 degrees C.); the authentication component AC3 at location L3 generates unique thermal signal T13 (such as 80 degrees C.); etc. The sensor 150 detects the unique temperature signature (T21, T22, and T23) in the different respective locations of the device 105 for the second applied voltage V2. In one embodiment, the system 100 matches the detected temperature signature feature associated with the device 105 to a known signature to authenticate the device as being valid.

Via application of a third input voltage (such as 16 VDC) from voltage source 140, first current flows through the circuit path 126 heating the authentication component AC1 (such as approximately 15 ohms), AC2 (such as approximately 45 ohms), AC3 (such as approximately 65 ohms), etc. In such an instance, the authentication component AC1 at location L1 generates unique thermal signal T11 (such as 70 degrees C.); the authentication component AC2 at location L2 generates unique thermal signal T12 (such as 55 degrees C.); the authentication component AC3 at location L3 generates unique thermal signal T13 (such as 90 degrees C.); etc. The sensor 150 detects the unique temperature signature (T11, T12, and T13) in the different respective locations of the device 105 for the third applied voltage V3. In one embodiment, the system 100 matches the detected temperature signature feature associated with the device 105 to a known signature to authenticate the device as being valid.

In one embodiment, the temperature values of the authentication component is measured via a thermal camera or temperature sensing device and all elements of the matrix of authentication components must be matched to appropriate values to authenticate a respective tag and product.

Thus, in one embodiment, when a voltage source 140 drives the authentication components, each of the respective multiple authentication components AC1, AC2, and AC3 in the layer of material 121 emits a different amount of thermal energy when activated via a corresponding applied signal. The unique emission of different amounts of thermal energy (such as based on detected temperature) from each of the authentication components in different regions or locations defines the overall signature of the authentication device. In one embodiment, sensor 150 (such as hardware and/or software) and system 100 maps attributes of the detected different magnitudes of thermal energy (such as measured via temperature in different regions) is compared (mapped) to a known-to-be valid thermal signature. Based on a match of the thermal signature of the apparatus under test to a known valid signature, the sensor 150 indicates that the device 105 is authentic (valid).

Additional details and permutations of embodiments herein are shown in the following figures.

Figure 2:
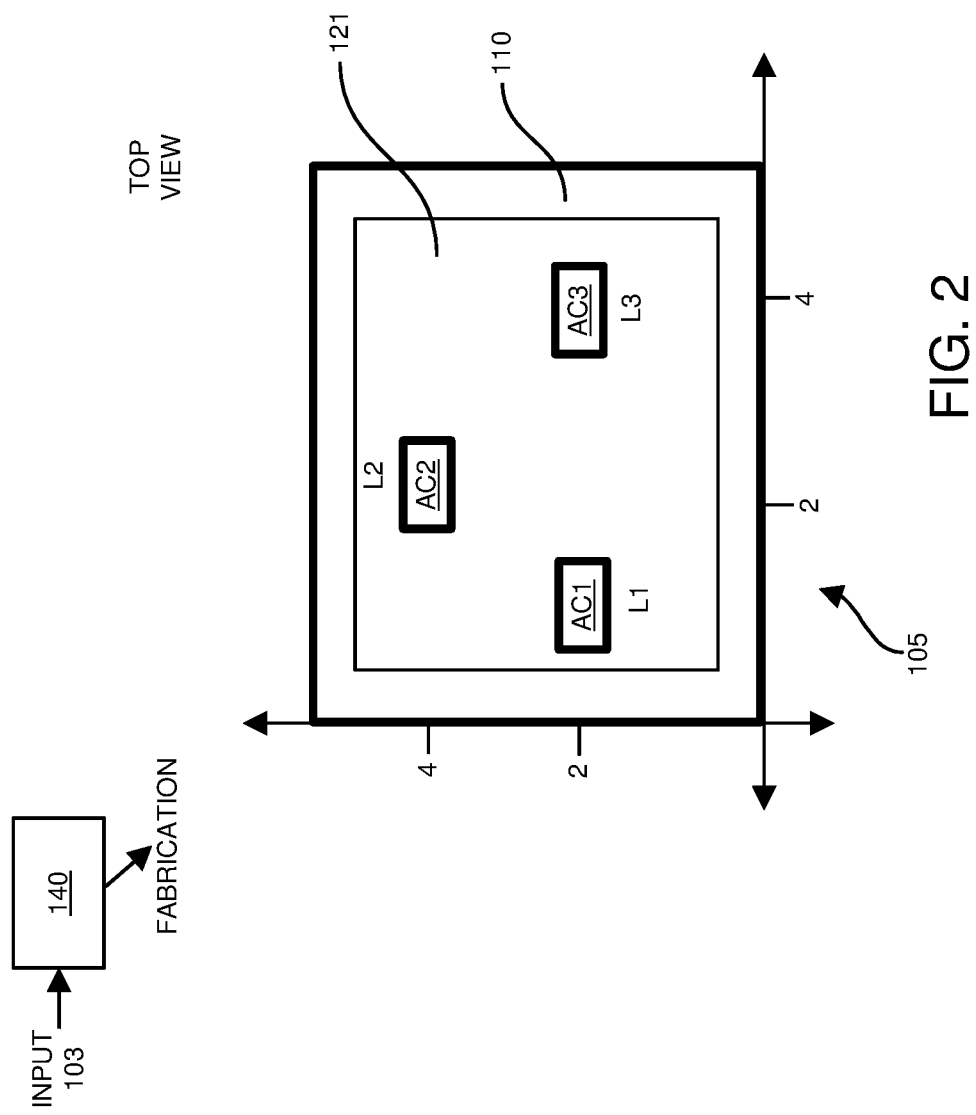
FIG. 2 is an example top view diagram of an authentication device and corresponding authentication components at different locations according to embodiments herein.

FIG. 2 is an example top view diagram of an authentication device and corresponding authentication components at different locations according to embodiments herein.

In this top view of the device 105, the multiple authentication components AC1, A2, AC3, etc., are disposed at different locations of the first layer of material 121.

For example, via appropriate processing (such as via laser sintering, etching, application of chemicals, heating, etc.), a fabricator resource 140 fabricates the authentication component AC1 at a first location L1 of the first layer of material 121. Additionally, the fabricator fabricates the authentication component AC2 at a second location L2 of the first layer of material 121; the fabricator resource fabricates the authentication component AC3 at a first location L3 of the first layer of material 121; and so on.

As previously discussed, note again that the first layer of material 121 can be configured to include any number of authentication components, each uniquely fabricated to provide a different response to respective input stimuli such as one or more input signal(s).

Referring again to FIG. 1, note that the sensor 150 can be configured to transmit an optical signal toward the layer of material 121. In one embodiment, each of the authentication components has different reflective properties depending on a transformation of respective material in a region in which the respective authentication component resides.

As previously discussed, the sensor 150 measures the magnitude of different reflective signals reflected off the layer of material 121 and corresponding locations of same to determine authenticity of the device 105. In such an embodiment, the signals T1, T2, T3, from the respective authentication components A1, AC2, and AC3, represent reflected optical energy used to determine a respective unique patter and thus authenticity of the device 105.

In yet further example embodiments, the first layer of material 121 is a compound comprising: first particles, the first particles being an insulator material; second particles, the second particles being electrically conductive material; and a combination of the first particles and the second particles distributed and suspended in a printable material in which a cured state of the printable material is transformable into an electrically conductive path region via application of heat above a threshold value or chemicals that change a property of the compound. In one embodiment, the cured first layer of material 121 on the substrate 110 is initially non electrically conductive because the first particles separate or reduce the second particles from contacting each other.

In further example embodiments, as previously discussed, fabrication of the multiple authentication components AC1, AC2, etc., includes modifying the state of the cured first layer of material 121 such that the modified one or more locations includes regions in which the second particles in the layer of material 121 contact each other to provide a more electrically conductive path (lower resistive path than the initial state of the first layer of material). Thus, in one embodiment, prior to application of respective heat in location L1, location L2, location L3, etc., these corresponding regions of the layer of material 121 are of a very high impedance such as above 1000 ohms because the electrically conductive particles do not touch each other. However, application of heat to these regions causes the layer material 121 in such regions to transform into registers that region 121. Application of heat to the regions causes the regions to become low impedance paths such as below 100 ohms.

As previously discussed, the authentication components can be connected to each other in a respective circuit path 126. Additionally, or alternatively, the authentication components can be isolated from each other without being connected via a respective circuit path.

In yet further example embodiments, the layer of material on the substrate is transformable dielectric material in which the multiple authentication components are fabricated via modification of regions in the transformable dielectric material.

Figure 3:
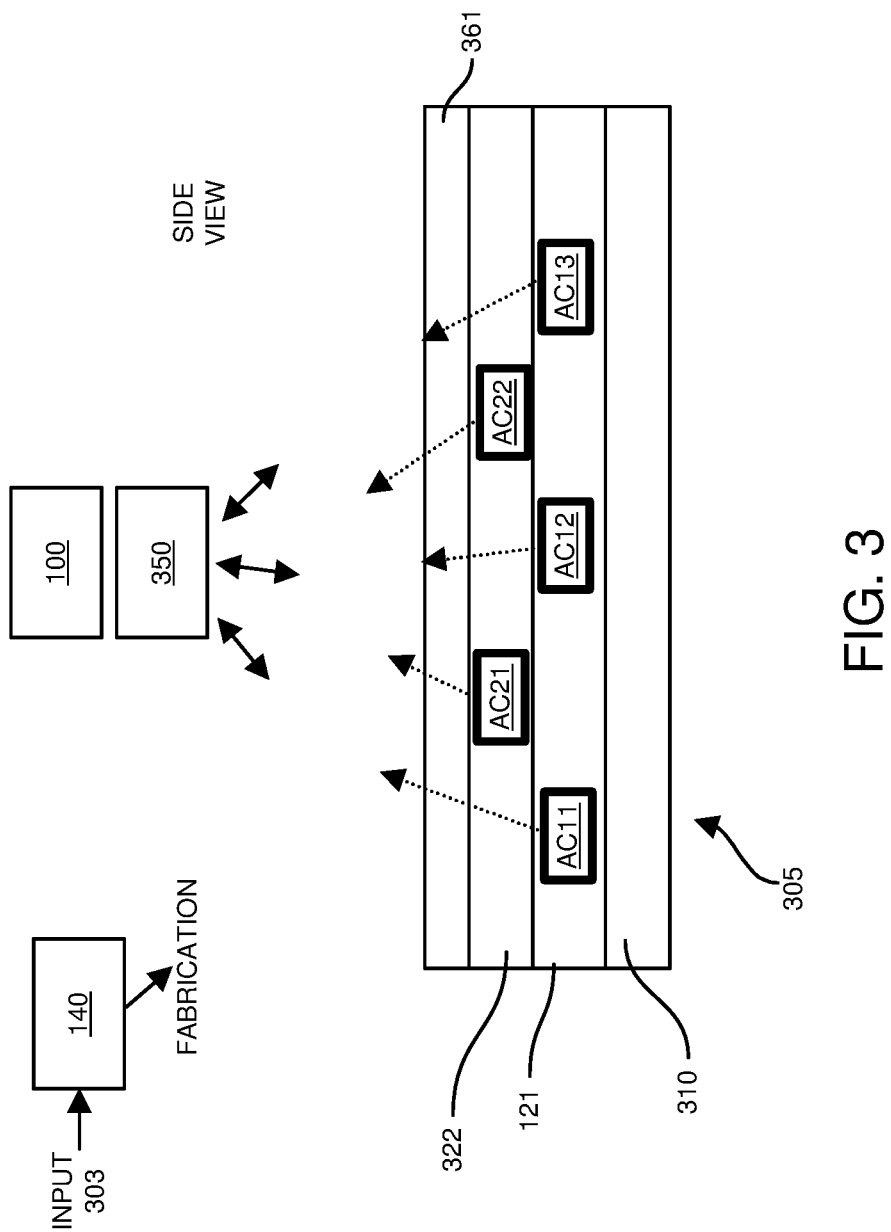
FIG. 3 is an example side view diagram of a multi-layer authentication device and corresponding authentication components according to embodiments herein.

FIG. 3 is an example side view diagram of a multi-layer authentication device and corresponding authentication components according to embodiments herein.

In this example embodiment, the device 305 includes a first layer of material 321 and a second layer of material 322 disposed on or above the substrate 310 such as non-electrically conductive material.

In one embodiment, in a manner as previously discussed, the first layer of material 121 includes multiple authentication components AC11, AC12, and AC13. The second layer of material 322 includes multiple authentication components AC21 and AC22 fabricated in a similar manner as authentication components in layer 121 as previously discussed.

In one embodiment, the second authentication components AC21, AC22, etc. are non-overlapping with respect to the first authentication components AC11, AC12, and AC13.

Each of the layers of material 121, 322, etc., on the substrate 310 is a different printable ink cured on the substrate and the processed to fabricate the multiple authentication components, attributes of which are modified during fabrication of respective one or more authentication components. In other words, fabrication of authentication components can include modifying attributes of the layer of material at different locations as previously discussed.

Note that the different layers of material 321, 322, etc., (such as different layers of cured printable ink) support different types of authentication components. For example, one layer of the device 305 as described herein includes first authentication components AC11, AC12, AC13, that have different emissive properties (such as generation of thermal energy, output of a wireless signal, etc.) when driven with a respective signal. The layer of material 322 as described herein includes authentication components AC21 and AC22 that have different reflective properties (such as reflection of incoming energy, optical signal, etc.). In one embodiment, the device 305 includes another layer of material of and corresponding authentication components that have different transparency properties (such as transmission of incoming energy, optical signal, etc.).

Note that as an alternative to fabricating the authentication components via fabrication of localized heat in the different layers such as via a laser or other suitable entity, embodiments herein include fabrication of the multiple authentication components via application of one or more chemical applied to the different locations in the layer of material.

Figure 4:
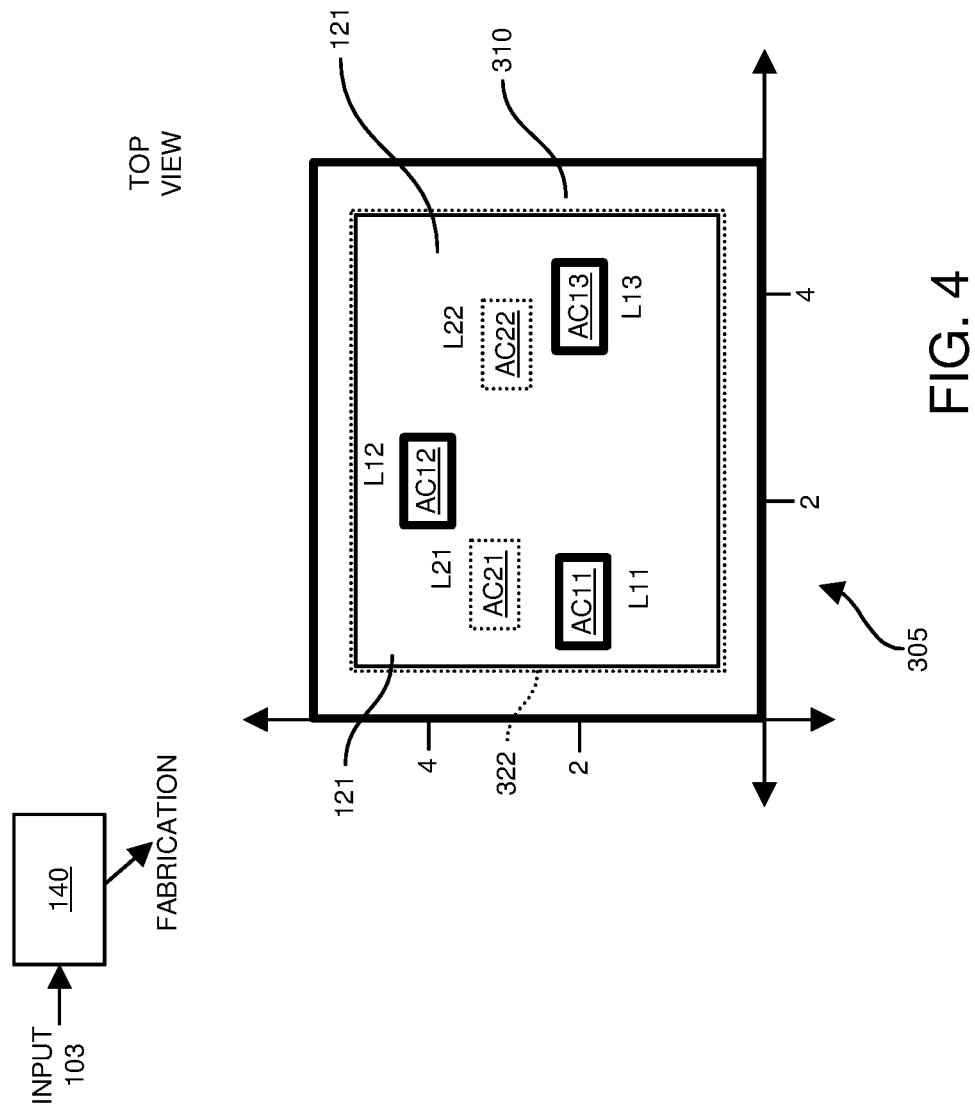
FIG. 4 is an example top view diagram of a multi-layer authentication device and corresponding authentication components at different locations according to embodiments herein.

FIG. 4 is an example top view diagram of a multi-layer authentication device and corresponding authentication components at different locations according to embodiments herein.

Via appropriate processing (such as via laser sintering, etching, application of chemicals, heating, etc.), a fabricator resource fabricates the authentication component AC11 at location L11 of the first layer of material 321; the fabricator resource fabricates the authentication component AC12 at location L12 of the first layer of material 321; fabricator resource fabricates the authentication component AC13 at location L13 in the first layer of material 321; and so on.

Additionally, the fabricator fabricates the authentication component AC21 at location L21 of the second layer of material 322; fabricator fabricates the authentication component AC22 at location L22 of the second layer of material 322; and so on.

Referring again to FIG. 3, note that that any sensor hardware/software as described herein can include multiple different types of sensors. For example, first authentication sensor hardware of the sensor 350 can be configured to analyze attributes of one or more authentication components (location, amount of feedback signal, etc.) in the first layer of material 321. Second authentication sensor hardware can be configured to analyze attributes of one or more authentication components (location, amount of feedback signal, etc.) in the second layer of material of the apparatus.

As previously discussed, the detected different levels of sensing at the different layers of material and corresponding analysis provides further assurances that the apparatus (or item to which it is attached) is authentic.

Figures 5A, 5B:
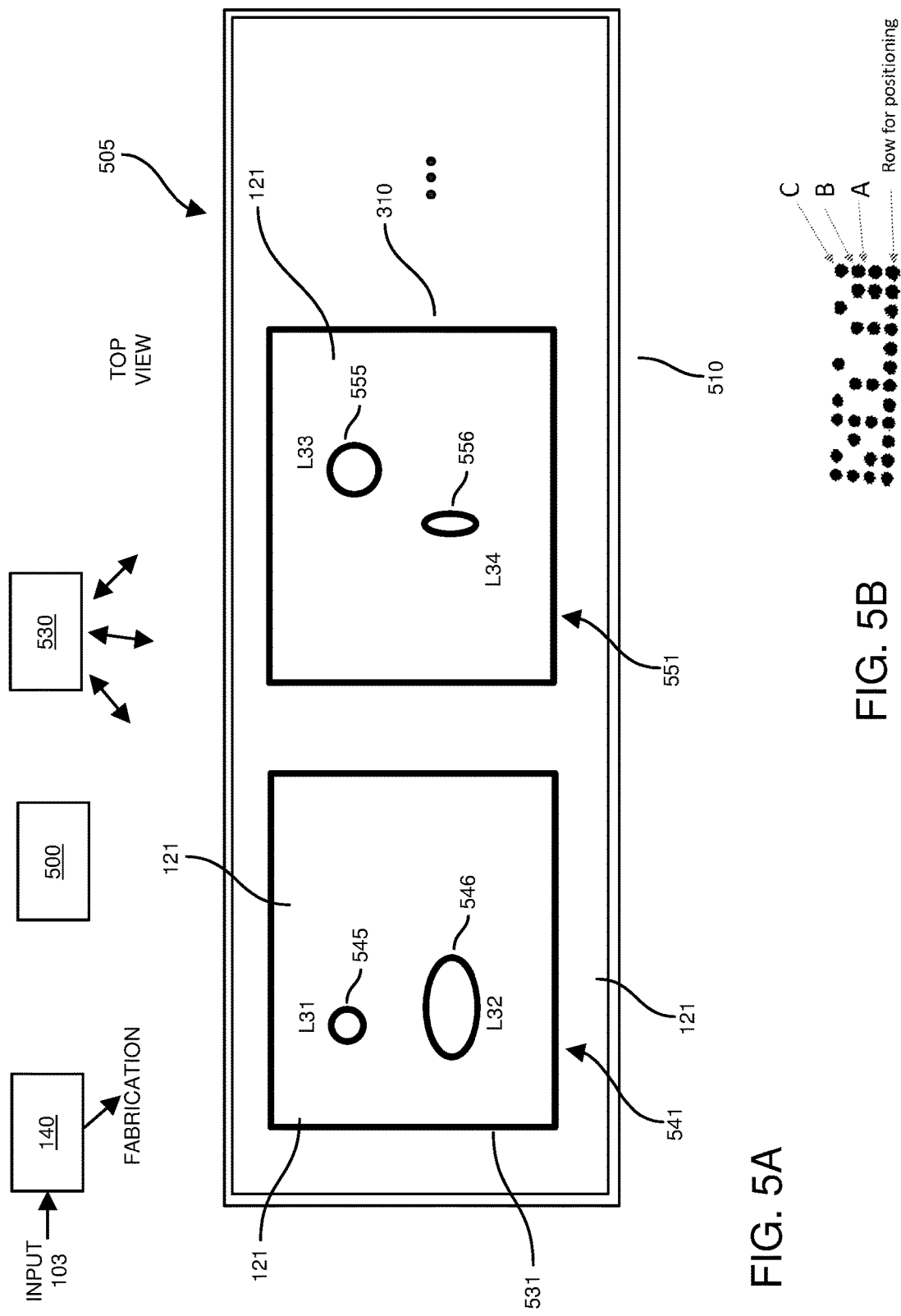
FIGS. 5A and 5B are example diagrams illustrating encoded elements according to embodiments herein.

FIG. 5A is an example diagram illustrating encoded elements according to embodiments herein.

In this example embodiment, the layer of material 521 (such as cured printed dielectric ink) is disposed on substrate 510. In a manner as previously discussed, a fabricator 140 applies heat or other stimulant to modify portions of the layer of material 521 to create one or more elements at different locations L11 and L12.

In this example embodiment, element 535 (such as an encoded letter A) includes a frame 530 encompassing corresponding sub-element 545 at location L11 and 546 at location L12. During fabrication, regions associated with each of the sub-elements 545 and 546 (such as authentication components) can be modified by different amounts such that the respective sub-elements have different emissive, reflective, or transparent properties in a manner as previously discussed.

During authentication testing, sensor 530 detects a signal or code from the different sub-elements 545 and 546. Based on location and magnitude of the received signals from regions L11 and L12 as detected by the sensor device 530 and corresponding authentication system, the sensor 530 and corresponding system maps the sub-elements to an appropriate value such as the letter A.

Different instances of the frame 530 can be configured to include one or more number of elements at respective one or more different locations in the frame 530. Locations of the different sub-elements in the respective frame indicate a particular letter of multiple letters. In such an instance, a sequence of multiple frames (each including one or more unique authentication components at different location within a grid of the frame) can be used to spell a word or sequence of letters.

FIG. 5B is an example diagram illustrating encoded elements according to embodiments herein.

In this example embodiment, the dots (authentication components) in FIG. 5B are fabricated from a thermally emissive material on the layer of material 121. They are dispensed on a thermally reflective background to make a matrix. The matrix is made of dots or empty spaces as shown in FIG. 5B.

The rows of dots represent the 1's and 0's in that represent a letter or number in a barcode. The empty spaces represent 0's and the dots are 1's. In one embodiment, the bottom most row of the dots is for positioning purposes. The first row above the bottom row is an encoding of the letter A; the second row above the bottom row is an encoding of the letter B; the first row above the bottom row is an encoding of the letter C; and so on.

In a manner as discussed herein, the dots in FIG. 5B either emit or reflect light in response to application of a respective one or more optical signals.

In one embodiment, a MATLAB™ graphical user interface used to analyze the thermal image that was taken and to decode the message in the dots.

Note that the device with dots can be made with material that are visibly transparent but appear otherwise appear when heat is applied to the device 505. For example, via a clear plastic substrate (emissive) with ITO dots (reflective). A further example of a device on which dots can be fabricated is discussed below in the following drawings and text.

Figure 6:
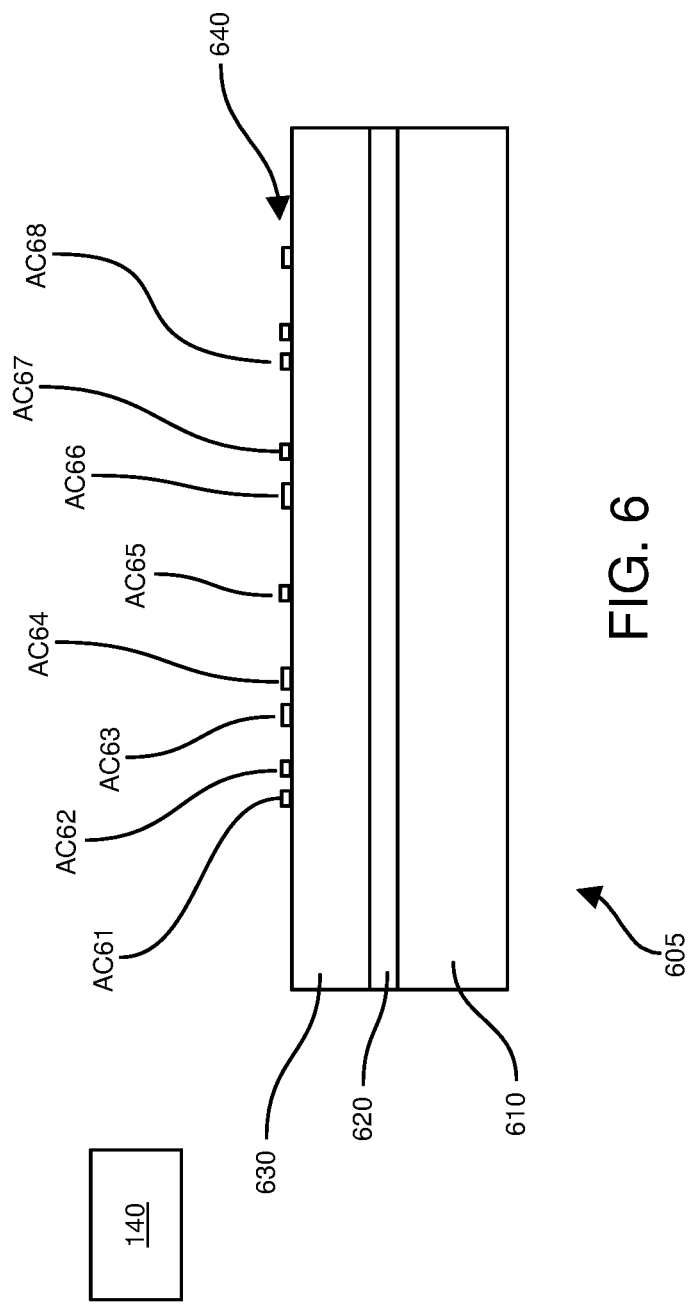
FIG. 6 is an example diagram illustrating an authentication security tag/device according to embodiments herein.

FIG. 6 is an example diagram illustrating an authentication tag/device according to embodiments herein.

In this example embodiment, the device 605 (such as security tag) comprises: a substrate 610 (such as plastic, electrically non-conductive material, insulator, ceramic, etc.); a pattern of electrically conductive material 620 (such as a circuit, traces, etc.) disposed on the substrate 610; a layer of material 630 (such as dielectric material, semiconductor material, etc.) disposed over the pattern of electrically conductive material 620; and a pattern of at least one type of ink (such as authentication components AC61, AC62, AC63, etc.) disposed on the layer of material 630.

The layer of material 630 can be fabricated from any suitable material. For example, in one embodiment, as mentioned, the layer material 630 is a semiconductor material. Additionally or alternatively, the layer of material 630 is fabricated via ferroelectric ink.

In one embodiment, the layer of material 630 is fabricated from so-called wide bandgap semiconductor material such as including one or more of Titanium dioxide, Zinc oxide, etc. In one embodiment, the layer of material 630 has a bandgap greater than 2 eV.

As further discussed herein, detection of the different characteristics associated with the device 605 (a.k.a., apparatus) in the presence of ultraviolet light, infrared light, heat, etc., enables unique authentication over conventional techniques, without the need for complex data processing equipment.

Figure 9:
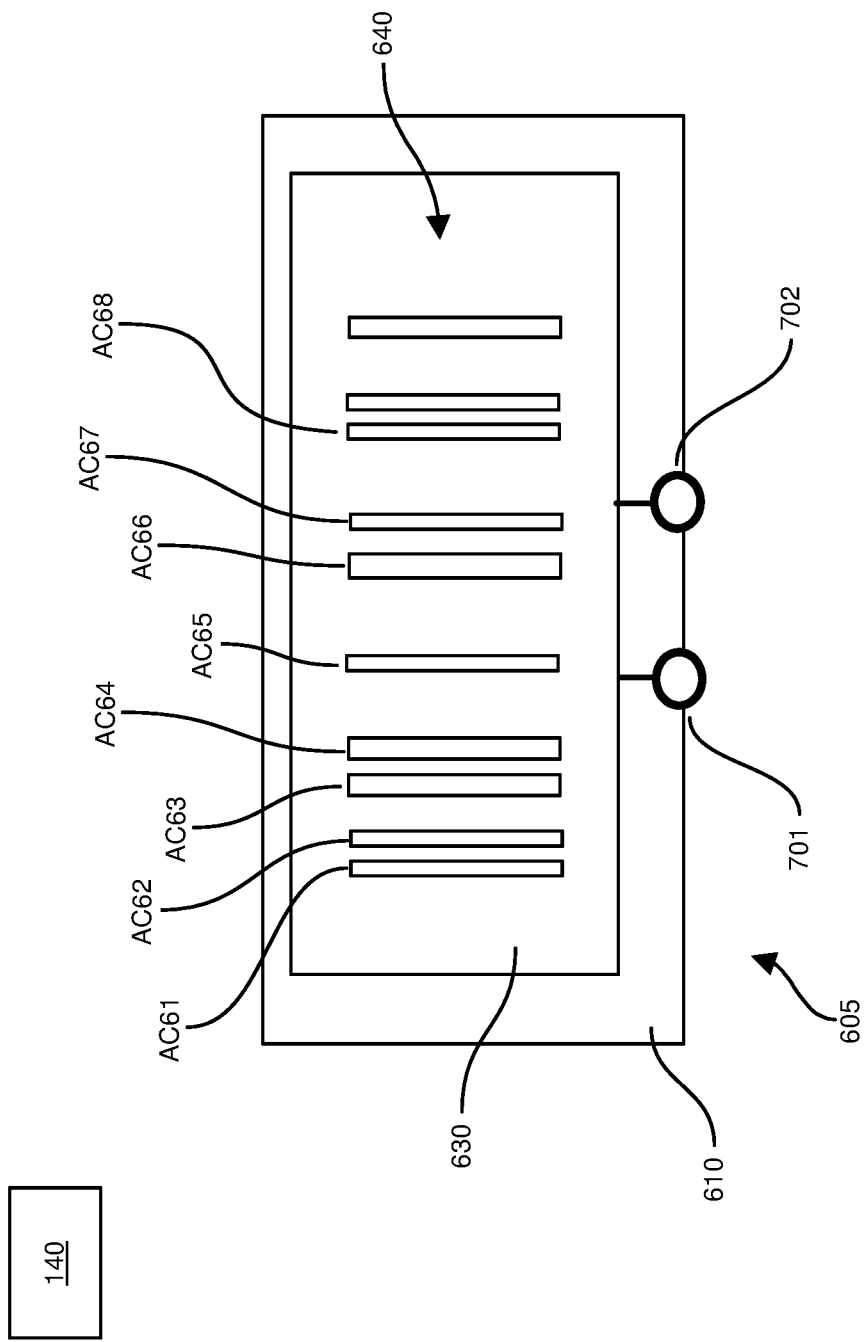
FIG. 9 is an example diagram illustrating printed ink disposed on a layer of material of an authentication tag/device according to embodiments herein.

The following FIGS. 7-9 describe fabrication of the respective security device 605 as discussed herein.

FIG. 7A is an example diagram illustrating a pattern of electrically conductive material disposed in a first layer of an authentication tag/device according to embodiments herein.

As previously discussed, the fabricator produces or receives material as discussed herein to fabricate the device 605.

For example, the fabricator 140 receives a substrate 610 or fabricates the substrate 610. The fabricator 140 then fabricates a pattern of electrically conductive material 620 on the substrate 610 such via depositing electrically conductive material (such as copper, there is no, alloy, etc.) onto the substrate 610 and then removing a portion of the material via etching.

As shown in FIG. 7A, the pattern of electrically conductive material 620 includes a first electrode 701 and a second electrode 702. In one embodiment, the electrically conductive material forms a capacitive circuit.

In further example embodiments, the circuit 620 is alternatively a resistor component, inductor component, etc. Embodiments herein include measuring one or more of a resistance, inductance, capacitance, etc., associated with the pattern of electrically conductive material 620 (one or more circuit components).

As further discussed herein, a circuit can be coupled to the first electrode 701 and the second electrode 702. In one embodiment, the circuit measures a capacitance of the capacitive circuit formed via pattern of electrically conductive material 620. The magnitude of the capacitance of the capacitive circuit (pattern of electrically conductive material 620) varies depending on the presence/absence of a body part in contact with a surface of the layer of material 630 as explained below.

In yet further example embodiments, the pattern of electrically conductive material 620 includes a first circuit path 651 (first fingers) and a second circuit path 652 (second fingers). The first circuit path 651 is interlaced with the second circuit path 652, but the circuit paths do not touch each other.

FIG. 7B is an example diagram illustrating a layer of material disposed over the pattern of electrically conductive material of an authentication tag/device according to embodiments herein.

In the next stage of producing the device 605, the fabricator 140 disposes a respective layer of material 630 over the pattern of electrically conductive material 620 as shown. Thus, embodiments herein include fabricating a layer of material 630 over the pattern of electrically conductive material 620. In one embodiment, the layer of material 630 is opaque and the pattern of electrically conductive material 620 is not viewable to the respective viewer.

As previously discussed, the pattern of electrically conductive material 620 includes a first electrode 701 and a second electrode 702.

The apparatus or system as discussed herein can be configured to further include a test circuit coupled to the first electrode 701 and the second electrode 702; the circuit is operative to measure an electrical signal generated by the pattern of electrically conductive material 620.

In one embodiment, the pattern of electrically conductive material 620 produces a respective electronic signal in response to application of an optical signal to the layer of material 630. A magnitude of the electrical signal (such as current or voltage) varies depending on absorption of the optical signal by the layer of material 630. For example, the layer of material 630 converts a received optical signal into electrons (such as photo-electrons) that flow through the pattern of electrically conductive material 620 to the electrodes.

In one embodiment, the pattern of electrically conductive material 620 produces the electronic signal via the photoelectric effect, which is the emission of electrons when electromagnetic radiation, such as light, is absorbed via the layer of material 630.

In one embodiment, the layer of material 630 is a dielectric material disposed between spaces of the first circuit path 651 and the second circuit path 652. As further discussed below, the fabricator 140 is operative to fabricate a pattern of at least one type of ink on the layer of material 630.

FIG. 8A is an example diagram illustrating a layer of material disposed over the pattern of electrically conductive material of an authentication tag/device according to embodiments herein.

In this example embodiment, the layer of material 630 (such as opaque) covers the pattern of electrically conductive material 620 such that it is not seen by a respective viewer. However, as previously discussed, the pattern of electrically conductive material 620 is disposed beneath the layer of material 630.

FIG. 8B is an example diagram illustrating printed ink disposed on a layer of material of an authentication tag/device according to embodiments herein.

In this example embodiment, the fabricator 140 prints one or more different types of inks in regions 640 on a surface of the layer of material 630. The dimensions of the regions 640 produce a unique pattern or code. As previously discussed in FIG. 5B, the pattern of authentication components disposed on the layer of material 630 can be dots, bars, etc.

FIG. 9 is an example diagram illustrating printed ink disposed on a layer of material of an authentication tag/device according to embodiments herein.

In yet further example embodiments, the pattern of at least one type of ink printed in display regions 640 is a code (barcode, tag, unique pattern, etc.) defined by dimensions and locations of the regions 640 of the at least one type of ink disposed on the layer of material 630.

Regions 640 in this example embodiment and corresponding code, signature, etc., on the layer of material 630.

In one embodiment, the pattern of at least one ink disposed in display regions 640 on the layer of material 630 includes: a first region (associated with authentication component AC61) of the layer of material 630 printed with a first ink type, the first region (AC61) is operative to emit a first optical signal (such as a first color or blue) via exposure of the first region (AC61) to ultraviolet light (350-410 nanometer wavelength). Under such conditions, the authentication component AC61 emits an optical signal at around a 450 nanometer wavelength.

The pattern of at least one ink disposed in display regions 640 on the layer of material 630 includes: a second region (associated with authentication component AC62) of the layer of material 630 printed with a second ink type, the second region (AC62) is operative to emit a second optical signal (such as a second color or yellow) via exposure of the first region (AC62) to ultraviolet light (350-370 nanometer wavelength). Under such conditions, the authentication component AC62 emits an optical signal at around a 570 nanometer wavelength.

The pattern of at least one ink disposed in display regions 640 on the layer of material 630 includes: a third region (associated with authentication component AC66) of the layer of material 630 printed with a third ink type, the third region (AC66) is operative to emit a third optical signal (such as a third color or red) via exposure of the first region (AC66) to ultraviolet light (350-400 nanometer wavelength). Under such conditions, the authentication component AC66 emits an optical signal at around a 610 nanometer wavelength.

The pattern of at least one ink disposed in display regions 640 on the layer of material 630 includes: fourth regions (associated with authentication component AC65 and AC67) of the layer of material 630 printed with a fourth ink type, the respective regions associated with (AC65 and AC67) are operative to emit a fourth optical signal (such as a fourth color or green) via exposure of the region (AC65 and AC67) to heat. Under such conditions, each of the authentication components AC65 and AC67 reflects a respective optical signal (such as visible light). Thus, the pattern of at least one ink disposed in regions 640 on the layer of material 630 includes: fourth regions (associated with authentication components AC65 and AC67) of the layer of material 630 printed with a thermally reflective ink that reflects an optical signal in the presence of applying heat to the layer of material 630.

The pattern of at least one ink disposed in regions 640 on the layer of material 630 includes: a fifth region (associated with authentication component AC63 and AC64) of the layer of material 630 printed with a fifth ink type, the respective regions associated with (AC63 and AC64) are operative to emit a fifth optical signal (such as a fourth color or green) via exposure of the region (AC63 and AC65) to a near Infrared signal (such as an optical signal at 948-983 nanometers wavelength). Under such conditions, each of the authentication components AC63 and AC64 emits an optical signal at around a 552 nanometer wavelength.

Note that the wavelength of excitation (input) and emission (output) optical signals as discussed herein are shown by way of non-limiting example embodiment and can vary depending on the embodiment.

Figure 10:
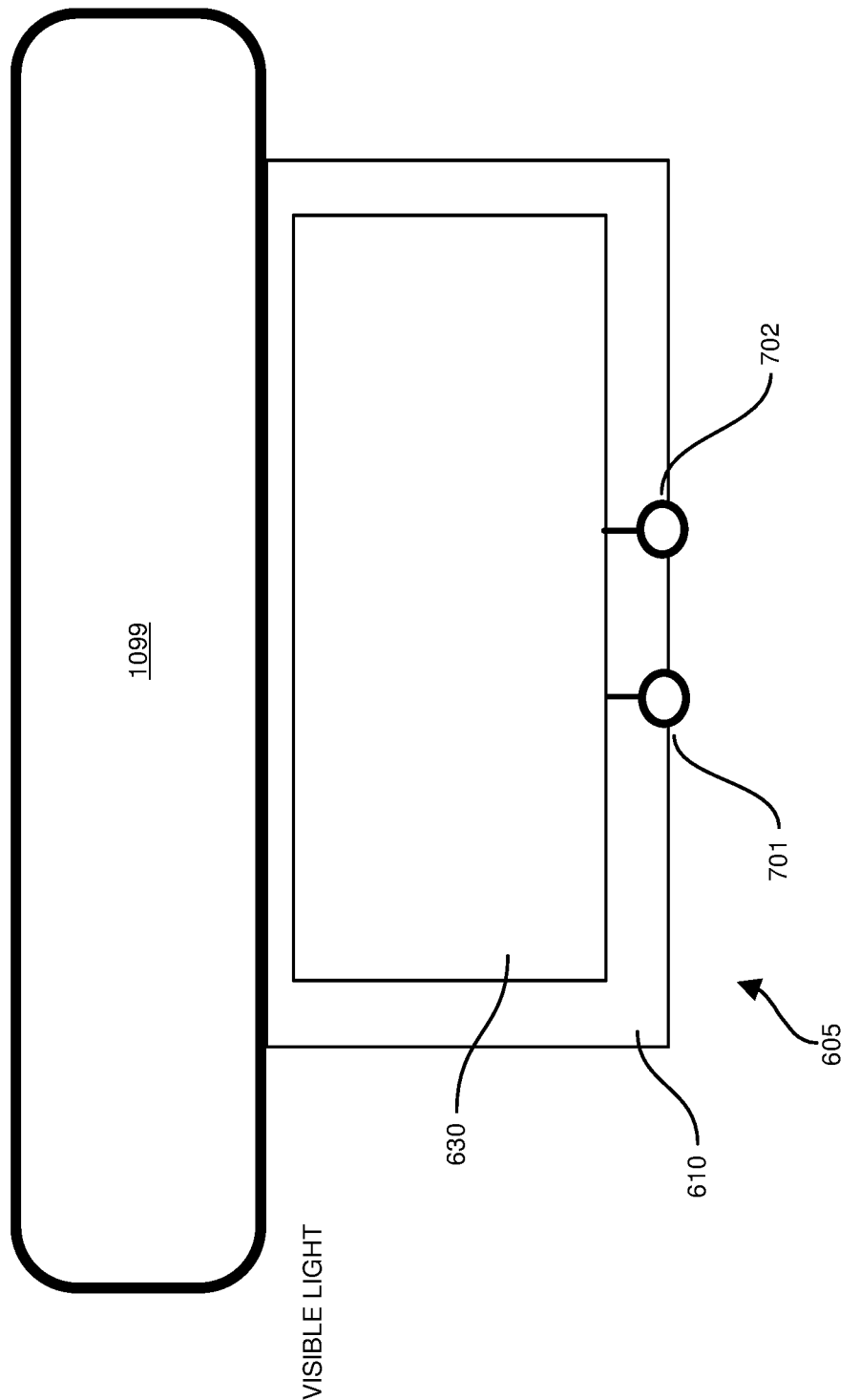
FIG. 10 is an example diagram illustrating affixing of an authentication tag/device to an item according to embodiments herein.

FIG. 10 is an example diagram illustrating affixing of an authentication tag/device to an item according to embodiments herein.

As shown in FIG. 10, the pattern of at least one type of ink disposed in regions 640 on the layer of material 630 of the device 605 is invisible to a human eye in the presence of light in the visible spectrum.

As previously discussed, application of ultraviolet light, infrared light, heat, etc., causes the at least one type of ink to emit an optical signal or reflect an optical signal and is thus detectable via a respective one or more sensors.

In one embodiment, if desired, the pattern of electrically conductive material underneath the layer of material 630 is a resistive element disposed between the first electrode 701 and the second electrode 702. Application of current through the resistive element causes the layer of material 630 and corresponding one or more printed inks to be heated and reflect an incident optical signal and/or emit an optical signal as discussed herein.

Further in this example embodiment, the device 605 is affixed to a respective item 1099 (such as object, package, etc.) that is being authenticated by the test bed (system) as discussed herein.

Figure 11:
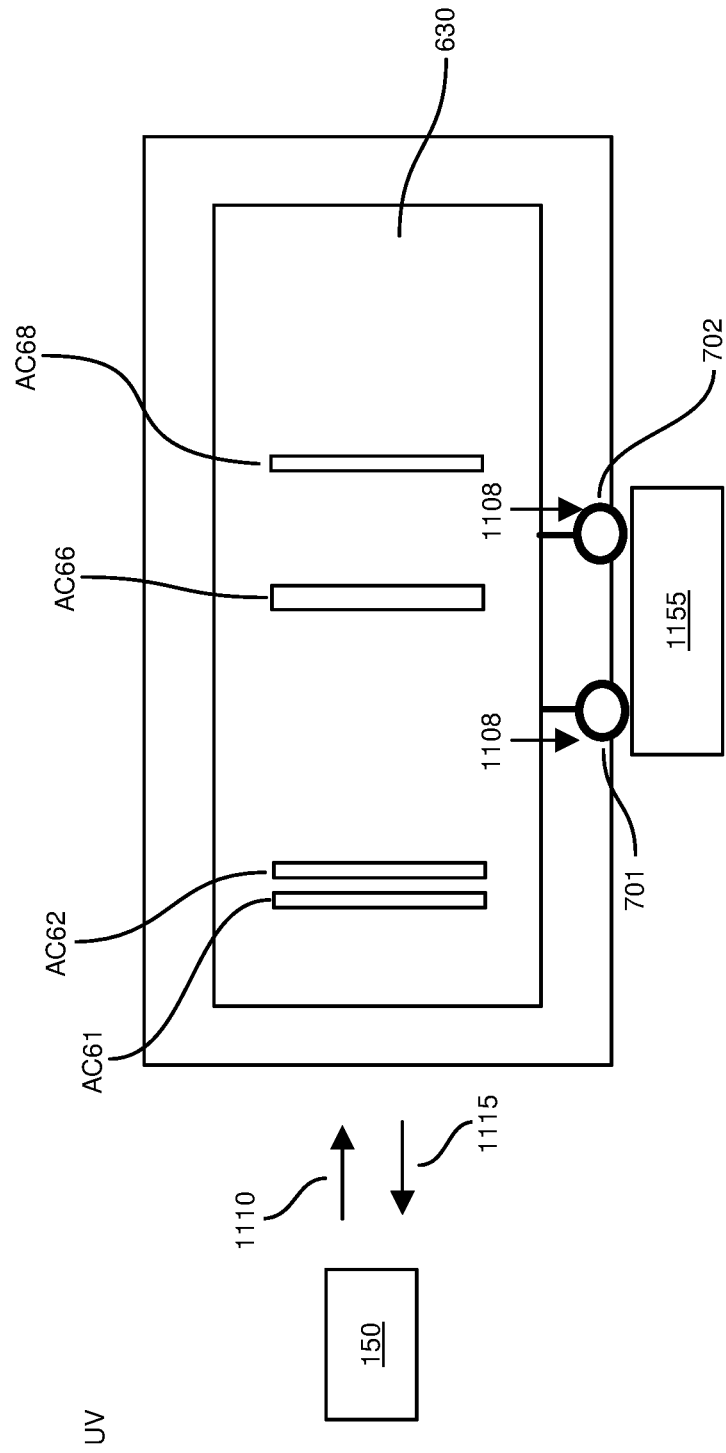
FIG. 11 is an example diagram illustrating application of a first optical signal to the authentication tag/device and corresponding illumination of instances of a first type of ink printed on a respective layer of material of the authentication tag/device according to embodiments herein.

FIG. 11 is an example diagram illustrating application of a first optical signal to the authentication tag/device and corresponding illumination of instances of a first type of ink printed on a respective layer of material of the authentication tag/device according to embodiments herein.

In this example embodiment, the test system 150 applies an optical signal 1110 (such as ultraviolet light) to the surface of layer of material 630. This causes the authentication components AC61, AC62, AC66, and AC68 to emit a respective optical signal 1115. The authentication system 150 records an image of the illuminated authentication components as shown in FIG. 11.

In accordance with further example embodiments, application of the optical signal 1110 causes the electrodes to output an electrical signal 1108 from one or more of the electrode 701 and electrode 702. The electrical signal 1108 can be any type such as current, voltage, etc. In this example embodiment, the monitoring system 1155 records the one or more attributes (such as magnitude, frequency, etc.) of the electrical signal outputted from the electrodes 701 and 702.

Thus, the monitor system 150 (a.k.a., test bed, test system, etc.) as discussed herein can be configured to further include a circuit 1155 temporarily coupled to the first electrode 701 and the second electrode, the circuit measures an electrical signal 1108 generated by the pattern of electrically conductive material 620. A magnitude of the electrical signal 1108 varies depending on absorption of an optical signal 1110 by the layer of material 630.

As previously discussed, in one embodiment, the at least one type of ink printed in regions 640 on the layer material 630 includes at least a first color of ultraviolet ink and a second color of ultraviolet ink. Further, as previously discussed, the first color of ultraviolet ink printed on the layer of material 630 is invisible in the absence of ultraviolet light and visible in the presence of ultraviolet light; and the second color of ultraviolet ink is invisible in the absence of ultraviolet light and visible in the presence of ultraviolet light.

More specifically, in this example embodiment, the pattern of at least one ink disposed in regions 640 on the layer of material 630 includes: a first region (associated with authentication component AC61) of the layer of material 630 printed with a first ink type, the first region (AC61) is operative to emit a first optical signal 1115 (such as a first color or blue) via exposure of the first region (AC61) to optical signal 1110 such as ultraviolet light (350-410 nanometer wavelength). Under such conditions, the authentication component AC61 emits an optical signal 1115 at around a 450 nanometer wavelength.

The pattern of at least one ink disposed in regions 640 on the layer of material 630 includes: a second region (associated with authentication component AC62) of the layer of material 630 printed with a second ink type, the second region (AC62) is operative to emit a second optical signal 1115 (such as a second color or yellow) via exposure of the second region (AC62) to ultraviolet light (350-370 nanometer wavelength). Under such conditions, the authentication component AC62 emits an optical signal 1115 at around a 570 nanometer wavelength.

The pattern of at least one ink disposed in display regions 640 on the layer of material 630 includes: a third region (associated with authentication component AC66) of the layer of material 630 printed with a third ink type, the third region (AC66) is operative to emit a third optical signal (such as a third color or red) via exposure of the third region (AC66) to ultraviolet light (350-400 nanometer wavelength). Under such conditions, the authentication component AC66 emits an optical signal 1115 at around a 610 nanometer wavelength.

As previously discussed, the system 150 records an image of the different color regions on layer of material 630.

Figure 12:
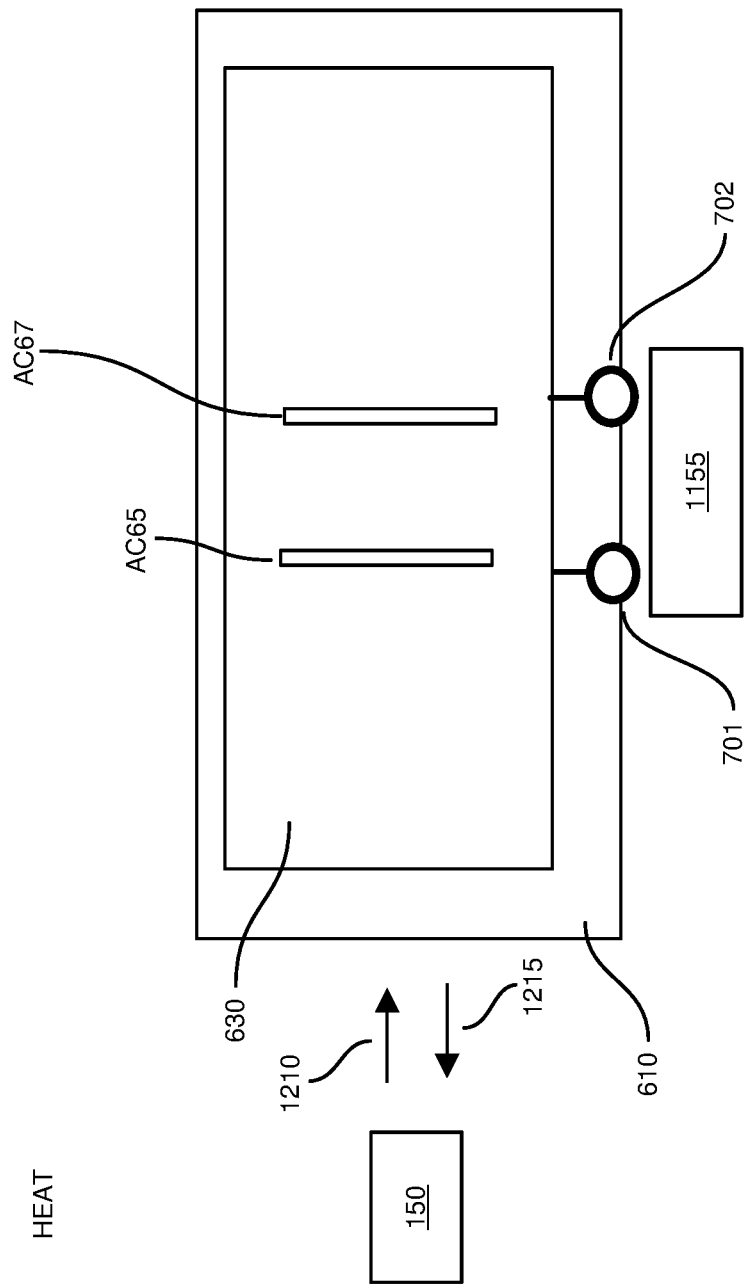
FIG. 12 is an example diagram illustrating application of a second optical signal to the authentication tag/device and corresponding illumination of instances of a second type of ink printed on a respective layer of material of the authentication tag/device according to embodiments herein.

FIG. 12 is an example diagram illustrating application of a second optical signal to the authentication tag/device and corresponding illumination of instances of a second type of ink printed on a respective layer of material of the authentication tag/device according to embodiments herein.

In this example embodiment, the test system 150 applies heat (such as input 1210) to the surface of layer of material 630. This causes the authentication components AC65 and AC67 to reflect a respective optical signal 1215. The authentication system 150 records an image of the illuminated authentication components as shown in FIG. 12.

Thus, the pattern of at least one ink disposed in regions 640 on the layer of material 630 includes: a fourth region (associated with authentication component AC65 and AC67) of the layer of material 630 printed with a fourth ink type, the respective regions associated with (AC65 and AC67) are operative to reflect a fourth optical signal (such as optical signal 1215) via exposure of the region (AC65 and AC67) to heat. Under such conditions, each of the authentication components AC65 and AC67 reflects a respective optical signal (such as visible light).

In one embodiment, the system 150 records an image of the different color regions including authentication components AC65 and AC67.

Figure 13:
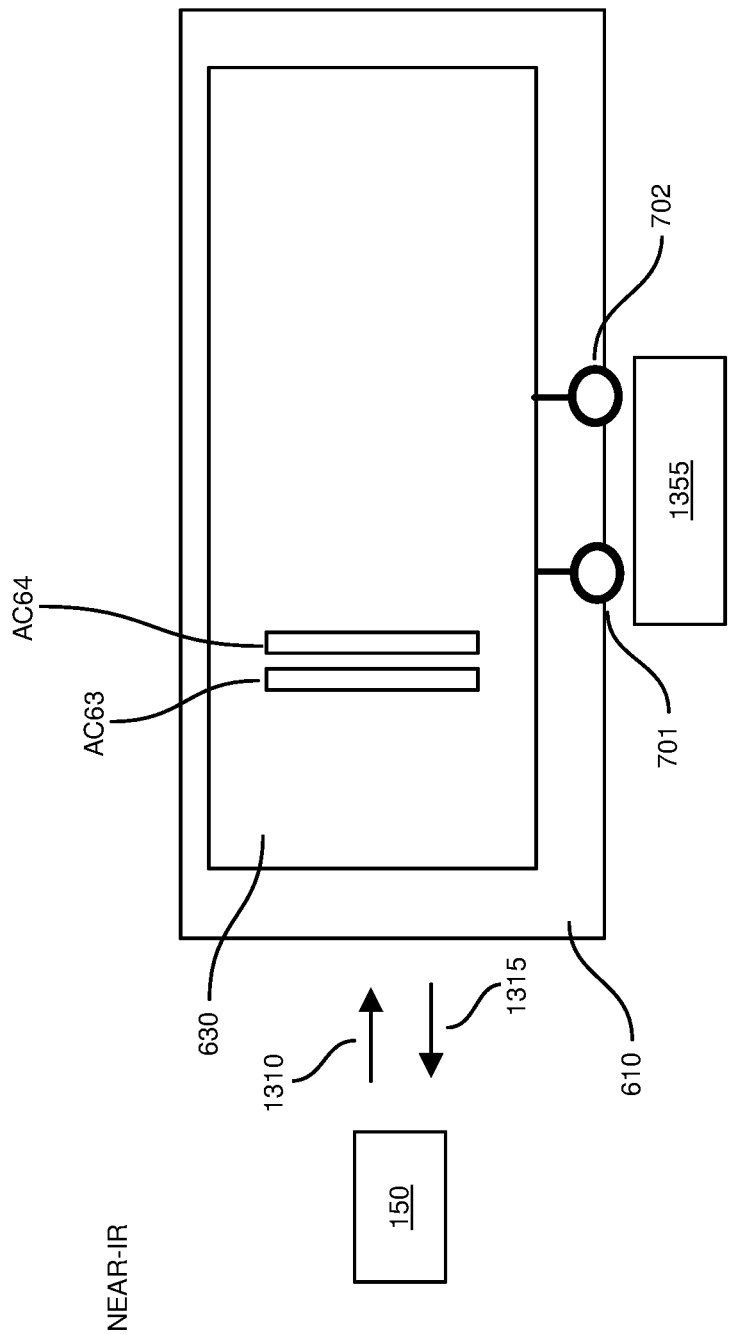
FIG. 13 is an example diagram illustrating application of heat to the authentication tag/device and corresponding illumination of instances of a third type of ink printed on a respective layer of material of the authentication tag/device according to embodiments herein.

FIG. 13 is an example diagram illustrating application of near infrared signal to the authentication tag/device and corresponding illumination of instances of a third type of ink printed on a respective layer of material of the authentication tag/device according to embodiments herein.

In this example embodiment, the test system 150 applies optical signal 1310 such as a near infrared signal to the surface of layer of material 630. This causes the authentication components AC63 and AC64 to emit a respective optical signal 1315. The authentication system 150 records an image of the illuminated authentication components as shown in FIG. 12.

Thus, in this example embodiment, the pattern of at least one ink disposed in display regions 640 on the layer of material 630 includes: regions (associated with authentication component AC63 and AC64) of the layer of material 630 printed with a fourth ink type, the respective regions associated with (AC63 and AC64) are operative to emit an optical signal 1315 (such as green) via exposure of the region (AC63 and AC64) to a near Infrared signal (such as an optical signal 1310 at 948-983 nanometers wavelength). Under such conditions, each of the authentication components AC63 and AC64 emits an optical signal at around a 552 nanometer wavelength.

In one embodiment, the system 150 records an image of the different color regions including authentication components AC63 and AC64.

Figure 14:
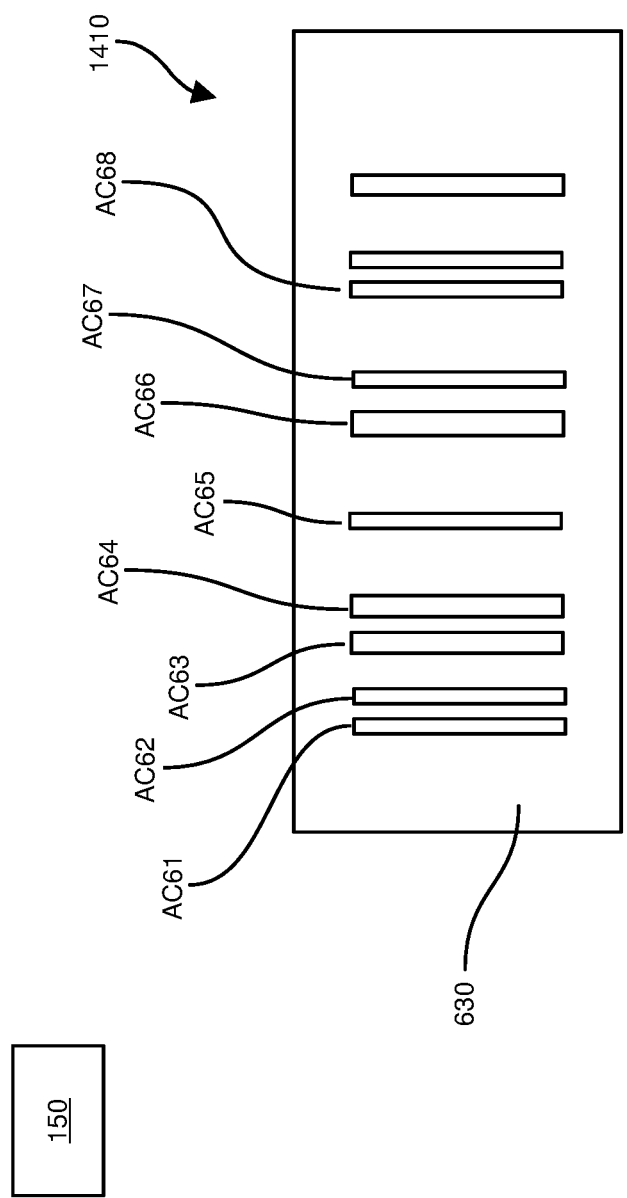
FIG. 14 is an example diagram illustrating a resulting image showing a combination of the multiple detected instances of different types of inks printed on a layer of material of the authentication tag/device according to embodiments herein.

FIG. 14 is an example diagram illustrating a resulting image showing a combination of the multiple detected instance of different types of inks printed on a layer of material of the authentication tag/device according to embodiments herein. Further embodiments herein include a test system to authenticate the apparatus (device 605) as discussed herein. For example, the authentication test system receives the device 605 as previously discussed and applies one or more input (such as ultraviolet light, visible light, voltage, infrared light, heat, etc.) at the same or different times to test the authenticity of the device 605 and corresponding item 1099.

If desired, the system 150 simultaneously applies the optical signals 1110, 1210, and 1310 to the surface of the layer of material 630 and corresponding regions 640 of printed inks. The system 150 produces the image of the different authentication components AC61, AC62, AC63, AC64, AC65, AC66, AC67, AC68, etc., at a time of simultaneously applying the optical signals 1110, 1210, and 1310 to the surface of the layer of material 630.

Thus, to test authenticity, in one embodiment, the test system 150 applies one or more optical signals to a surface of the layer of material. As a first part of an authentication test, the test system produces one or more first images the different types of ink illuminated in the ink pattern printed on the layer of material. The different types of ink are illuminated the application of one or more stimuli such as an ultraviolet optical signal, an infrared optical signal, heat, etc., to the layer of material on which the pattern of ink is printed.

As a second part of the authentication test, potentially while simultaneously applying the optical signals 1110, 1210, and 1310 to the surface of the layer of material 630, the test system 150 measures a first electronic signal generated by the pattern of electrically conductive material. In one embodiment, the pattern of electrically conductive material 620 is a capacitance circuit that generates the first electronic signal in response to one or more condition such as presence or absence of a respective body part in contact with the layer of material 630 over the pattern of electrically conductive material 620. Via the first electronic signal, the test system determines a capacitance (or changing capacitance) associated with the pattern of electrically conductive material.

As a third part of the authentication test, via a second electronic signal produced by the pattern of electrically conductive material 620, potentially while simultaneously applying the input such as signals 1110, 1210, and 1310 to the surface of the layer of material 630, the test system 150 determines current produced by the pattern of electrically conductive material as a result of applying an optical signal to the surface of the layer of material 630. In one embodiment, as previously discussed, the layer of material 630 disposed over the pattern of electrically conductive material 620 converts energy from the optical signal applied to the layer of material into the second electronic signal (such as a respective voltage and/or current).

As previously discussed, as a fourth part of the authentication test, the authentication system 150 applies heat to a surface of the layer of material 630. Application of the heat to the surface of the layer of material 630 causes the regions 640 of printed ink to emit optical signal. In one embodiment, during application of the heat, the authentication system produces an image of a second type of ink illuminated in the pattern of at least one type of ink on the layer. If desired the first image, second image, etc., can be combined to detect an overall unique signature associated with the apparatus (security device) as discussed herein.

In one embodiment, the system 150 produces a respective combined image 1410 based on individual images collected via application ultraviolet light, infrared light, and heat in the prior FIGS. 11, 12, and 13. Based on analysis of the device 605 and detected one or more attributes associated with the device 605 such as i) dimensions such as location, size, etc., associated with each of the detected authentication components AC61, AC62, AC63, AC64, AC65, AC66, AC67, AC68, etc., ii) measured capacitance associated with the pattern of electrically conductive material 620 in the presence of an object such as a body part touching the layer of material 630 over the pattern of electrically conductive material 620, iii) measured capacitance associated with the pattern of electrically conductive material 620 in the absence of an object such as a body part touching the layer of material 630 over the pattern of electrically conductive material 620, iv) measured optical signal produced by the pattern of electrically conductive material 620 during application of an optical signal such as ultraviolet light to the printed ink in regions 640 of the layer of material 630, etc., the test system 150 determines authenticity of the device 605 (tag).

In one embodiment, determining authenticity of the device 605 and corresponding item 1099 includes comparing one or more of the detected parameters as previously discussed to an expected standard. If the detected one or more parameters match the expected standard, the device 605 passes the authentication test and the system produces a perceptible output (such as image, optical signal, audible signal, etc.) indicating the pass condition. Conversely, if the detected one or more parameters do not match the expected standard, the device 605 fails the authentication test and the system produces a perceptible output (such as image, optical signal, audible signal, etc.) indicating the failure condition.

Thus, further embodiments herein include a method of testing a respective security tag (device) comprising: receiving the apparatus (device) 605 in which the device includes multiple inks disposed on the layer of material 630; applying one or more optical signals to a surface of the layer of material on which the multiple inks are disposed; producing an image 1410 (or individual images in FIGS. 11, 12, and 13) of the multiple inks; and utilizing the image 1410 of the multiple inks to determine an authenticity of the security device (apparatus).

In one embodiment, the multiple inks include: i) a first ink disposed in a first region on a surface of the layer of material 630, and ii) a second ink disposed in a second region on the surface of the layer of material 630.

In further example embodiments, exposure of the first ink to the optical signal results in emission of a first color of light from the first ink disposed on the layer of material; and exposure of the second ink to the optical signal results in emission of a second color of light from the second first ink disposed on the layer of material. In accordance with producing the image, the test system measures an electronic signal generated by the pattern of electrically conductive material in the device.

The test system 150 determines authenticity of the apparatus based on i) dimensions of the detected first ink and detected second ink on the surface of the layer of material, and ii) the measured electronic signal. In one embodiment, as previously discussed, the dimensions and location of the detected first ink and detected second ink define a code that is used to authenticate the device or corresponding item to which the device is attached.

In accordance with yet further example embodiments, via the measured electronic signal, the test system 150 determines a capacitance associated with the pattern of electrically conductive material. Additionally, or alternatively, via the electronic signal, the test system measures current produced by the pattern of electrically conductive material as a result of applying the optical signal to the surface of the layer of material.

In still further example embodiments, the test system 150 simultaneously applies the optical signal and a heat signal to the surface of the layer of material. In such an instance, the image includes detected illumination of a first ink and a second ink disposed on the surface of the layer of material as a result of applying the optical signal; the image also includes detected presence of a third ink disposed on the surface of the layer of material as a result of applying the heat. The test system 150 analyzes attributes of the multiple detected inks and attributes of the electronic signal to determine whether the apparatus (device) is authentic.

Figure 15:
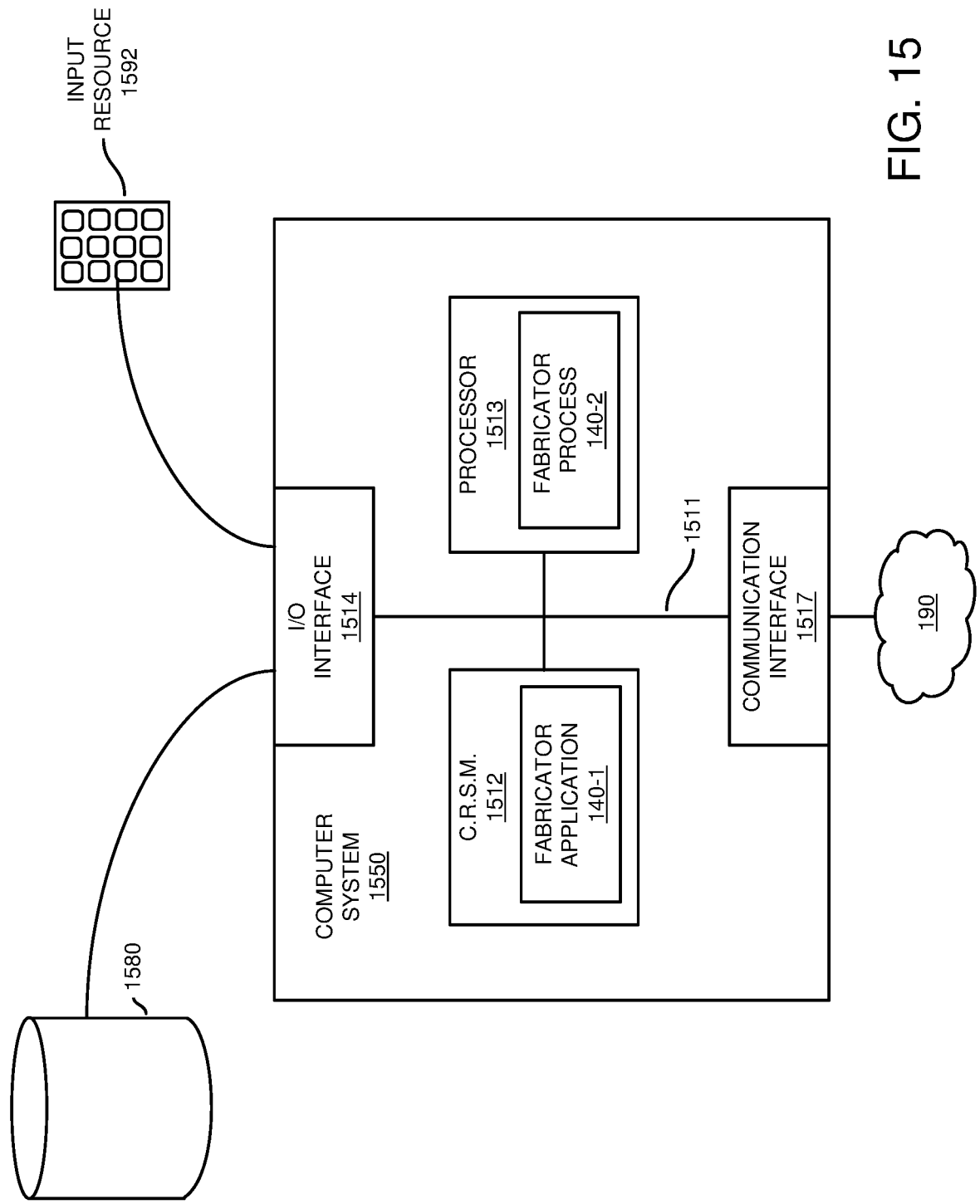
FIG. 15 is an example diagram illustrating example computer architecture operable to execute one or more operations according to embodiments herein.

FIG. 15 is an example block diagram of a computer system for implementing any of the operations as previously discussed according to embodiments herein.

Any of the resources (such as fabricator 140, tester, test system 150, etc.) as discussed herein can be configured to include computer processor hardware and/or corresponding executable instructions to carry out the different operations as discussed herein.

As shown, computer system 1550 of the present example includes an interconnect 1511 that coupling computer readable storage hardware 1512 such as a non-transitory type of media (which can be any suitable type of hardware storage medium in which digital information can be stored and retrieved), a processor 1513 (computer processor hardware), I/O interface 1514, and a communications interface 1517.

I/O interface(s) 1514 supports connectivity to repository 1580 and input resource 1592.

Computer readable storage medium 1512 can be any hardware storage device such as memory, optical storage, hard drive, floppy disk, etc. In one embodiment, the computer readable storage medium 1512 stores instructions and/or data.

As shown, computer readable storage media 1512 can be encoded with fabrication management application 140-1 (e.g., including instructions) to carry out any of the operations as discussed herein.

During operation of one embodiment, processor 1513 accesses computer readable storage media 1512 via the use of interconnect 1511 in order to launch, run, execute, interpret or otherwise perform the instructions in fabrication management application 140-1 stored on computer readable storage medium 1512. Execution of the fabrication management application 140-1 produces fabrication management process 140-2 to carry out any of the operations and/or processes as discussed herein.

Those skilled in the art will understand that the computer system 1550 can include other processes and/or software and hardware components, such as an operating system that controls allocation and use of hardware resources to execute management application 140-1.

In accordance with different embodiments, note that computer system may reside in any of various types of devices, including, but not limited to, a mobile computer, a personal computer system, wireless station, connection management resource, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIGS. 16 and 17. Note that the steps in the flowcharts below can be executed in any suitable order.

Figure 16:
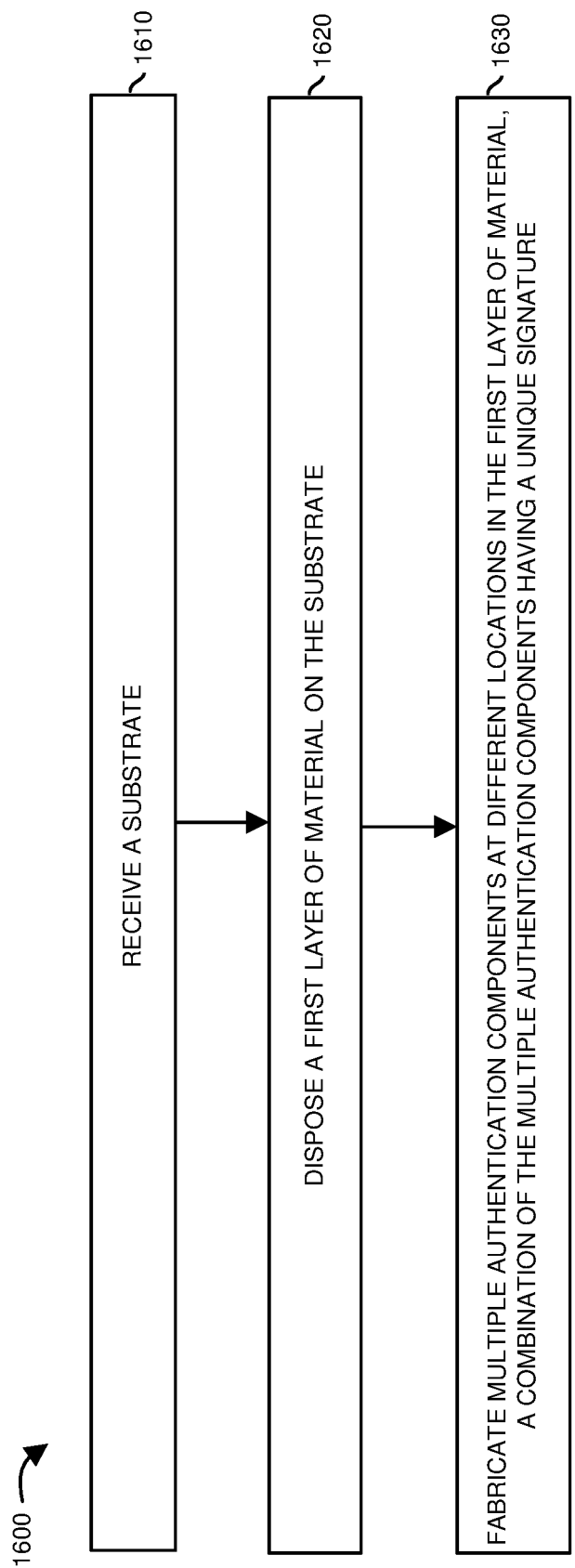
FIG. 16 is an example diagram illustrating a method according to embodiments herein.

FIG. 16 is a flowchart 1600 illustrating an example method according to embodiments. Note that there will be some overlap with respect to concepts as discussed above.

In processing operation 1610, the fabricator 140 receives a substrate 110.

In processing operation 1620, the fabricator 140 fabricates a first layer of material 121 on the substrate 110.

In processing operation 1630, the fabricator 140 fabricates multiple authentication components AC1, AC2, AC3, etc., at different locations in the first layer of material 121. The combination of the multiple authentication components AC1, AC2, etc., has a unique signature as detectable by a respective one or more sensors.

Figure 17:
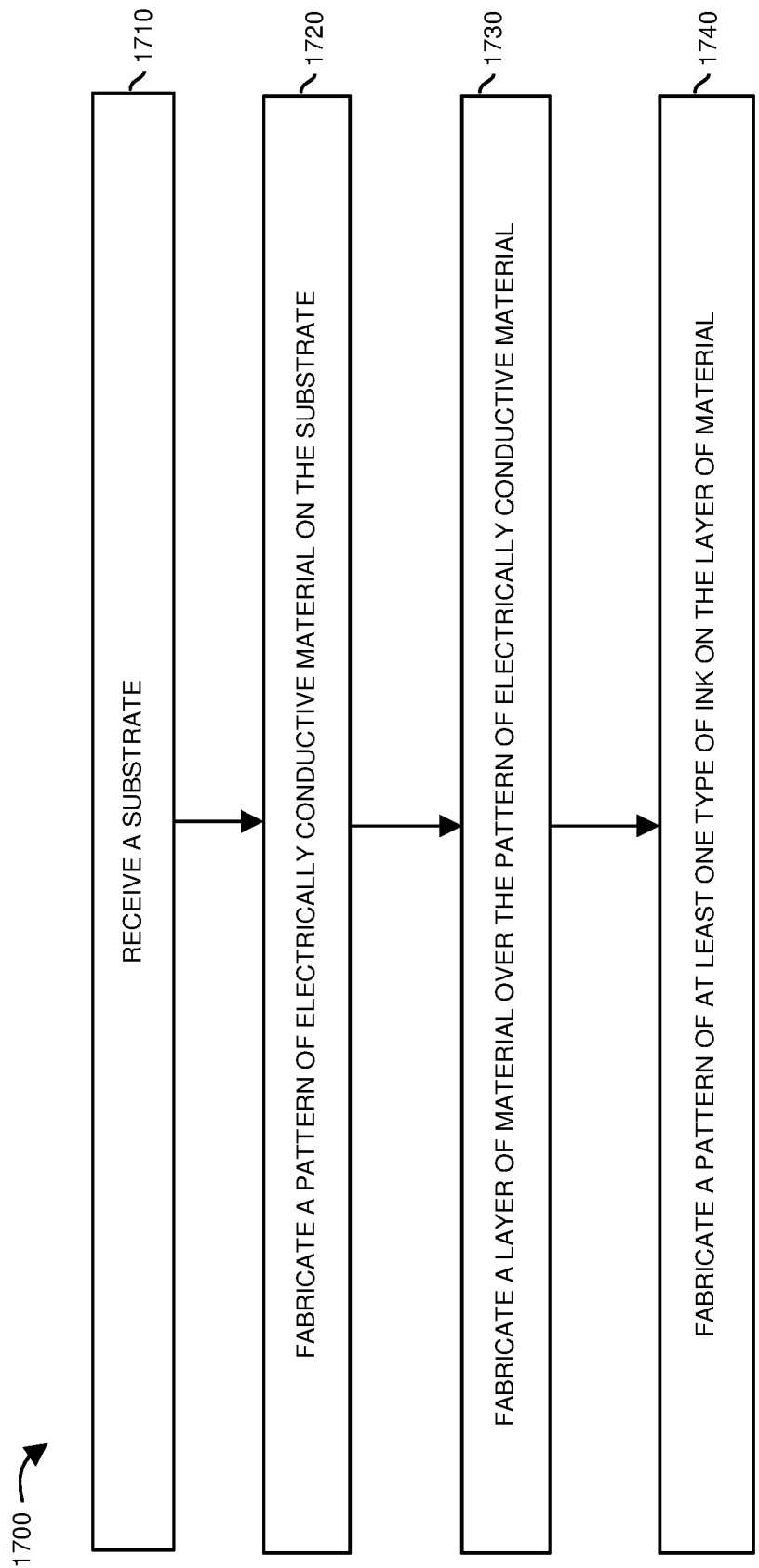
FIG. 17 is an example diagram illustrating a method according to embodiments herein.

FIG. 17 is a flowchart 1700 illustrating an example method according to embodiments. Note that there will be some overlap with respect to concepts as discussed above.

In processing operation 1710, the fabricator 140 receives a substrate 610.

In processing operation 1720, the fabricator 140 fabricates a pattern of electrically conductive material 620 on the substrate 610.

In processing operation 1730, the fabricator 140 fabricates a layer of material 630 over the pattern of electrically conductive material 620 and the remaining exposed portion of substrate 610.

In processing operation 1740, the fabricator 140 fabricates a pattern of at least one type of ink in display regions 640 on the layer of material 630.

Note again that techniques herein are well suited to facilitate authentication of a respective item via an authentication tag (device 105, 305, 505, 605, etc.). However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

The invention claimed is:

1. An apparatus comprising:
   a substrate;
   a first layer of material disposed on the substrate; and
   multiple authentication components disposed at different locations in the first layer of material, a combination of the multiple authentication components having a unique signature;
   wherein the first layer of material is transformable dielectric material; and
   wherein the multiple authentication components are formed via modification of the transformable dielectric material.

2. The apparatus as in claim 1, wherein each of the multiple authentication components is a respective electronic circuit component.

3. The apparatus as in claim 1 further comprising:
   a second layer of material disposed on the first layer of material, the second layer of material preventing the multiple authentication components from being viewable via a human visible spectrum of light.

4. The apparatus as in claim 1, wherein the multiple authentication components include a first authentication component at a first location of the first layer of material, the first authentication component formed via application of localized heat to the first location; and
   wherein the multiple authentication components include a second authentication component at a second location of the first layer of material, the second authentication component formed via application of localized heat to the second location.

5. The apparatus as in claim 1, wherein the multiple authentication components are formed via application of a chemical applied at different locations of the first layer of material.

6. The apparatus as in claim 1, wherein each of the authentication components is one or more of:
   i) emissive,
   ii) reflective, or
   iii) transparent.

7. The apparatus as in claim 1, wherein the multiple authentication components are first authentication components, the apparatus further comprising:
   a second layer of material disposed on the first layer of material; and
   second authentication components disposed at different locations in the second layer of material.

8. The apparatus as in claim 7, wherein the second authentication components are non-overlapping with respect to the first authentication components.

9. The apparatus as in claim 7, wherein each of the first authentication components is optically emissive; and
   wherein each of the first authentication components is reflective.

10. The apparatus as in claim 7, wherein each of the first authentication components is optically emissive; and
    wherein each of the second authentication components is reflective.

11. The apparatus as in claim 1 further comprising:
    electronic circuitry operative to drive the multiple authentication components with a signal; and
    wherein each of the multiple authentication components emits a respective wireless signal.

12. An apparatus comprising:
    a substrate;
    a first layer of material disposed on the substrate; and
    multiple authentication components disposed at different locations in the first layer of material, a combination of the multiple authentication components having a unique signature;
    wherein each of the multiple authentication components is a respective electronic circuit component;

wherein each of the multiple authentication components is one of:
i) a resistor, or
ii) a capacitor.

13. An apparatus comprising:
a substrate;
a first layer of material disposed on the substrate; and
multiple authentication components disposed at different locations in the first layer of material, a combination of the multiple authentication components having a unique signature;
wherein the first layer of material is a compound comprising:
first particles, the first particles being an insulator material;
second particles, the second particles being electrically conductive material; and
a combination of the first particles and the second particles distributed and suspended in a printable material in which a cured state of the printable material is transformable into an electrically conductive path via application of heat above a threshold value.

14. An apparatus comprising:
a substrate;
a first layer of material disposed on the substrate; and
multiple authentication components disposed at different locations in the first layer of material, a combination of the multiple authentication components having a unique signature;
wherein each of the multiple authentication components emits a different amount of thermal energy when activated via a corresponding applied signal.

15. An apparatus comprising:
a substrate;
a first layer of material disposed on the substrate;
multiple authentication components disposed at different locations in the first layer of material, a combination of the multiple authentication components having a unique signature;
wherein each of the multiple authentication components reflects a different amount of thermal energy when exposed to an applied optical input signal.

16. A method comprising:
receiving a substrate;
disposing a first layer of material on the substrate;
fabricating multiple authentication components at different locations in the first layer of material, a combination of the multiple authentication components having a unique signature;
wherein each of the multiple authentication components is a respective electronic circuit component; and
wherein each of the multiple authentication components is one of: i) a resistor, or ii) a capacitor.

17. The method as in claim 16 further comprising:
fabricating a second layer of material on the first layer of material, the second layer of material preventing the multiple authentication components from being viewable via a human visible spectrum of light.

18. The method as in claim 16 further comprising:
fabricating a first authentication component at a first location of the first layer of material, the first authentication component fabricated via application of localized heat to the first location; and
fabricating a second authentication component at a second location of the first layer of material, the second authentication component fabricated via application of localized heat to the second location.

* * * * *